United States Patent
Li et al.

(10) Patent No.: US 12,240,779 B2
(45) Date of Patent: Mar. 4, 2025

(54) CRYSTALLIZED GLASS OF THREE-DIMENSIONAL SHAPE, CHEMICALLY STRENGTHENED GLASS OF THREE-DIMENSIONAL SHAPE, AND METHOD FOR PRODUCING CRYSTALLIZED GLASS OF THREE-DIMENSIONAL SHAPE AND CHEMICALLY STRENGTHENED GLASS OF THREE-DIMENSIONAL SHAPE

(71) Applicant: AGC Inc., Tokyo (JP)

(72) Inventors: Qing Li, Tokyo (JP); Kenji Imakita, Tokyo (JP); Akio Koike, Tokyo (JP); Eriko Maeda, Tokyo (JP)

(73) Assignee: AGC Inc., Tokyo (JP)

( * ) Notice: Subject to any disclaimer, the term of this patent is extended or adjusted under 35 U.S.C. 154(b) by 257 days.

(21) Appl. No.: 17/525,554

(22) Filed: Nov. 12, 2021

(65) Prior Publication Data
US 2022/0064054 A1 Mar. 3, 2022

Related U.S. Application Data

(63) Continuation of application No. 16/936,533, filed on Jul. 23, 2020, which is a continuation of application No. PCT/JP2019/006907, filed on Feb. 22, 2019.

(30) Foreign Application Priority Data

Feb. 27, 2018 (JP) .................. 2018-033693
Feb. 8, 2019 (JP) .................. 2019-021896

(51) Int. Cl.
C03C 10/00 (2006.01)
C03B 23/025 (2006.01)
(Continued)

(52) U.S. Cl.
CPC ...... *C03C 10/0027* (2013.01); *C03B 23/0252* (2013.01); *C03B 32/02* (2013.01);
(Continued)

(58) Field of Classification Search
None
See application file for complete search history.

(56) References Cited

U.S. PATENT DOCUMENTS 6,472,338 B1 10/2002 Shimatani et al.
7,000,430 B1 2/2006 Fotheringham et al.
(Continued)

FOREIGN PATENT DOCUMENTS

CN 1344233 A 4/2002
CN 104870393 A 8/2015
(Continued)

OTHER PUBLICATIONS

U.S. Appl. No. 62/736,682 (Year: 2018).*
(Continued)

*Primary Examiner* — David Sample
(74) *Attorney, Agent, or Firm* — Oblon, McClelland, Maier & Neustadt, L.L.P.

(57) ABSTRACT

The present invention provides crystallized glass of three-dimensional shape for easily producing chemically strengthened glass of three-dimensional shape that resists damage and has exceptional transparency. This crystallized glass of three-dimensional shape: contains crystals; has light transmittance in terms of a thickness of 0.8 mm of 80% or higher; and contains 45-74% $SiO_2$, 1-30% $Al_2O_3$, 1-25% $Li_2O$, 0-10% $Na_2O$, 0-5% $K_2O$, a total of 0-15% of $SnO_2$ and/or $ZrO_2$, and 0-12% $P_2O_5$, these amounts expressing the oxide-based mass percentage.

22 Claims, 4 Drawing Sheets

(51) Int. Cl.
*C03B 32/02* (2006.01)
*C03C 4/00* (2006.01)
*C03C 21/00* (2006.01)

(52) U.S. Cl.
CPC ........ *C03C 4/0028* (2013.01); *C03C 10/0054* (2013.01); *C03C 21/002* (2013.01); *C03C 2204/00* (2013.01)

(56) References Cited

U.S. PATENT DOCUMENTS

| | | |
|---|---|---|
| 7,017,370 B1 | 3/2006 | Fotheringham et al. |
| 11,718,556 B2 | 8/2023 | Li et al. |
| 2005/0090377 A1 | 4/2005 | Shelestak et al. |
| 2005/0143246 A1 | 6/2005 | Comte et al. |
| 2009/0263662 A1 | 10/2009 | Shelestak et al. |
| 2010/0233407 A1 | 9/2010 | Shelestak et al. |
| 2011/0079048 A1 | 4/2011 | Shelestak et al. |
| 2012/0196109 A1 | 8/2012 | Marjanovic et al. |
| 2013/0189486 A1 | 7/2013 | Wang et al. |
| 2013/0224492 A1 | 8/2013 | Bookbinder et al. |
| 2014/0134397 A1 | 5/2014 | Amin et al. |
| 2015/0064474 A1 | 3/2015 | Dejneka et al. |
| 2015/0274581 A1 | 10/2015 | Beall et al. |
| 2015/0299036 A1 | 10/2015 | Ukrainczyk et al. |
| 2015/0368140 A1 | 12/2015 | Ikemoto et al. |
| 2016/0023944 A1 | 1/2016 | Bookbinder et al. |
| 2016/0102010 A1 | 4/2016 | Beall et al. |
| 2016/0152512 A9 | 6/2016 | Beall et al. |
| 2017/0144921 A1 | 5/2017 | Beall et al. |
| 2017/0297956 A1 | 10/2017 | Bookbinder et al. |
| 2017/0334767 A1 | 11/2017 | Beall et al. |
| 2018/0022640 A1 | 1/2018 | Dejneka et al. |
| 2018/0186685 A1 | 7/2018 | Murayama et al. |
| 2018/0186686 A1 | 7/2018 | Beall et al. |
| 2018/0265397 A1 | 9/2018 | Murayama et al. |
| 2018/0319706 A1 | 11/2018 | Murayama et al. |
| 2018/0327304 A1 | 11/2018 | Murayama et al. |
| 2019/0071348 A1 | 3/2019 | Beall et al. |
| 2019/0194057 A1 | 6/2019 | Murayama et al. |
| 2019/0263713 A1 | 8/2019 | Murayama et al. |
| 2019/0292099 A1 | 9/2019 | Murayama et al. |
| 2020/0002221 A1 | 1/2020 | Beall et al. |
| 2020/0017398 A1 | 1/2020 | Click et al. |
| 2020/0017399 A1* | 1/2020 | Click ................. C03C 10/0036 |
| 2020/0123046 A1 | 4/2020 | Dejneka et al. |
| 2020/0131080 A1 | 4/2020 | Yuan |
| 2020/0156994 A1 | 5/2020 | Li et al. |
| 2020/0180992 A1* | 6/2020 | Rai ....................... C03C 21/002 |
| 2020/0207660 A1 | 7/2020 | Li et al. |
| 2020/0231491 A1 | 7/2020 | Beall et al. |
| 2020/0239354 A1 | 7/2020 | Li et al. |
| 2021/0002164 A1 | 1/2021 | Beall et al. |
| 2021/0024405 A1 | 1/2021 | Yu et al. |
| 2021/0053867 A1 | 2/2021 | Murayama et al. |
| 2021/0101824 A1 | 4/2021 | Beall et al. |
| 2021/0101825 A1 | 4/2021 | Beall et al. |
| 2021/0114919 A1 | 4/2021 | Beall et al. |
| 2021/0114920 A1 | 4/2021 | Beall et al. |
| 2021/0206684 A1 | 7/2021 | Nozaki et al. |
| 2022/0048810 A1 | 2/2022 | Yu et al. |
| 2022/0274869 A1 | 9/2022 | Murayama et al. |

FOREIGN PATENT DOCUMENTS

| | | |
|---|---|---|
| CN | 105143125 A | 12/2015 |
| CN | 106103369 A | 11/2016 |
| CN | 107902909 A | 4/2018 |
| CN | 108473369 A | 8/2018 |
| CN | 108473370 A | 8/2018 |
| CN | 109133670 A | 1/2019 |
| JP | 3-23237 A | 1/1991 |
| JP | 2001-48582 A | 2/2001 |
| JP | 2005-53711 A | 3/2005 |
| JP | 2007-527354 A | 9/2007 |
| JP | 2010-116315 | 5/2010 |
| JP | 2013-520385 A | 6/2013 |
| JP | 2013-541485 A | 11/2013 |
| JP | 2016-160136 A | 9/2016 |
| JP | 2016-529197 A | 9/2016 |
| JP | 2016-529201 A | 9/2016 |
| JP | 2017-190265 A | 10/2017 |
| JP | 2017-530933 A | 10/2017 |
| WO | WO 2014/167894 A1 | 10/2014 |
| WO | WO 2016/154235 A1 | 9/2016 |
| WO | WO 2017/179401 | 10/2017 |
| WO | WO 2019/022033 A1 | 1/2019 |
| WO | WO 2019/022035 A1 | 1/2019 |

OTHER PUBLICATIONS

U.S. Appl. No. 62/755,787 (Year: 2018).*
International Search Report issued Nov. 12, 2019 in PCT/JP2019/033487, 1 page.
International Search Report issued May 21, 2019 in PCT/JP2019/006907 filed on Feb. 22, 2019, 1 page.
Zhichao Zhou et al., "Microstructure Analysis of Inorganic Materials", Zhejiang University Press, Dec. 31, 1993, vol. 1, pp. 284-285 (with English Translation).
Office Action mailed Jul. 8, 2024 in related U.S. Appl. No. 17/443,202.
U.S. Appl. No. 62/698,532, Click et al. (Year: 2018).

* cited by examiner

CRYSTALLIZED GLASS OF THREE-DIMENSIONAL SHAPE, CHEMICALLY STRENGTHENED GLASS OF THREE-DIMENSIONAL SHAPE, AND METHOD FOR PRODUCING CRYSTALLIZED GLASS OF THREE-DIMENSIONAL SHAPE AND CHEMICALLY STRENGTHENED GLASS OF THREE-DIMENSIONAL SHAPE

This application is a continuation of U.S. application Ser. No. 16/936,533 filed Jul. 23, 2020, pending, which is a continuation of PCT/JP2019/006907 filed Feb. 22, 2019 and claims the benefit of JP 2018-033693 filed Feb. 27, 2018 and JP 2019-021896 filed Feb. 8, 2021.

TECHNICAL FIELD

The present invention relates to a three-dimensionally shaped crystallized glass having high transparency and excellent chemical strengthening properties, and relates to a production method thereof. The present invention also relates to a three-dimensionally shaped chemically strengthened glass and a production method thereof.

BACKGROUND ART

A thin chemically strengthened glass having high-strength is used as a cover glass of a display unit of a mobile device such as cell phone and smartphone or as a cover glass of an in-vehicle display member such as instrument panel and head-up display (HUD). In such a display unit, a cover glass having a three-dimensional shape (curved shape) is sometimes required so as to improve the operability and visibility. The three-dimensionally shaped cover glass is produced by a method in which a flat glass sheet is heated and then subjected to bend-forming (sometimes referred to as three-dimensional forming) using forming molds (see, Patent Literature 1).

Patent Literature 2 discloses a lithium aluminosilicate glass capable of being three-dimensionally formed and chemically strengthened.

Patent Literature 3 discloses a chemically strengthened crystallized glass.

CITATION LIST

Patent Literature

Patent Literature 1: International Publication WO2014/167894
Patent Literature 2: JP-T-2013-520385 (the term "JP-T" as used herein means a published Japanese translation of a PCT patent application)
Patent Literature 3: JP-T-2016-529201

SUMMARY OF INVENTION

Technical Problem

The chemical strengthening properties of a crystallized glass are greatly affected by a glass composition and a precipitated crystal. Scratch resistance and transparency of the crystallized glass are also greatly affected by a glass composition and a precipitated crystal. In order to obtain a crystallized glass excellent in both chemical strengthening properties and transparency, the glass composition and precipitated crystal need to be subtly adjusted.

The method for obtaining a three-dimensionally shaped crystallized glass includes a method in which an amorphous glass is bend-formed and then crystallized, a method in which an amorphous glass is crystallized and then processed into a three-dimensional shape by grinding or other methods, and a method in which an amorphous glass is crystallized and then bend-formed.

According to the method in which an amorphous glass is bend-formed and then crystallized, since a heat treatment is performed after the forming, not only deformation is likely to occur but also a dimensional change is caused at the time of crystallization of the amorphous glass, thereby making it difficult to obtain a desired shape. According to the method in which an amorphous glass is crystallized and then processed into a three-dimensional shape by grinding or other methods, the grinding processing takes a long time and therefore the production efficiency is low.

Then, it is preferable to crystallize an amorphous glass and then perform bend-forming. However a crystallized glass generally has a higher softening temperature, compared with an amorphous glass, and thus bend-forming thereof is difficult. In addition, when a transparent crystallized glass is heated at a high temperature so as to bend-form the glass, crystals in the crystallized glass are likely to grow excessively, thereby giving rise to a problem such as reduction in transparency.

In consideration of these, an object of the present invention is to provide a three-dimensionally shaped crystallized glass for easily producing a three-dimensionally shaped chemically strengthened glass that is scratch-resistant and has excellent transparency.

In addition, an object of the present invention is to provide a three-dimensionally shaped chemically strengthened glass that is scratch-resistant and has excellent transparency, obtained by chemically strengthening the three-dimensionally shaped crystallized glass above.

Furthermore, an object of the present invention is to provide a production method of a chemically strengthened glass that is the three-dimensionally shaped crystallized glass above.

Solution to Problem

The present invention provides a three-dimensionally shaped crystallized glass including a crystal, the glass having a light transmittance of 80% or more in terms of a thickness of 0.8 mm and including, in mass % on an oxide basis, from 45 to 74% of $SiO_2$, from 1 to 30% of $Al_2O_3$, from 1 to 25% of $Li_2O$, from 0 to 10% of $Na_2O$, from 0 to 5% of $K_2O$, from 0 to 15% in total of either one or more of $SnO_2$ and $ZrO_2$, and from 0 to 12% of $P_2O_5$.

In addition, the present invention provides a three-dimensionally shaped chemically strengthened glass having a compressive stress layer on a surface thereof, the glass being a crystallized glass including a crystal, having a light transmittance of 80% or more in terms of a thickness of 0.8 mm and including, in mass % on an oxide basis, from 45 to 74% of $SiO_2$, from 1 to 30% of $Al_2O_3$, from 1 to 25% of $Li_2O$, from 0 to 10% of $Na_2O$, from 0 to 5% of $K_2O$, from 0 to 15% in total of either one or more of $SnO_2$ and $ZrO_2$, and from 0 to 12% of $P_2O_5$.

The present invention also provides a production method of a glass for chemical strengthening, the method including heating and crystallizing a glass including, in mass % on an oxide basis, from 45 to 74% of $SiO_2$, from 1 to 30% of $Al_2O_3$, from 2 to 25% of $Li_2O$, from 0 to 10% of $Na_2O$, from 0 to 5% of $K_2O$, from 0 to 15% in total of either one or more of $SnO_2$ and $ZrO_2$, and from 0 to 12% of $P_2O_5$, and bend-forming a resulting crystallized glass under heating.

Furthermore, the present invention provides a production method of a chemically strengthened glass, including heating and crystallizing a glass including, in mass % on an oxide basis, from 45 to 74% of $SiO_2$, from 1 to 30% of $Al_2O_3$, from 2 to 25% of $Li_2O$, from 0 to 10% of $Na_2O$, from 0 to 5% of $K_2O$, from 0 to 15% in total of either one or more of $SnO_2$ and $ZrO_2$, and from 0 to 12% of $P_2O_5$, bend-forming a resulting crystallized glass under heating, and thereafter, chemically strengthening the glass.

Advantageous Effects of Invention

In the present invention, a three-dimensionally shaped crystallized glass for easily producing a three-dimensionally shaped chemically strengthened glass that is scratch-resistant and has excellent transparency, is obtained.

In addition, the chemically strengthened glass of the present invention is scratch-resistant, has excellent transparency, and can be easily produced by chemically strengthening the three-dimensionally shaped crystallized glass of the present invention.

Furthermore, in the production method of the chemically strengthened glass of the present invention, the three-dimensionally shaped crystallized glass of the present invention is obtained.

DESCRIPTION OF EMBODIMENTS

Figure 1:
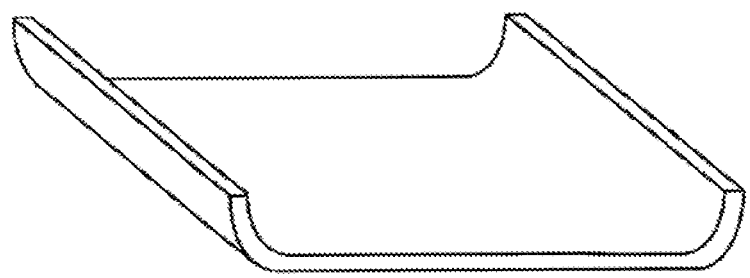
FIG. 1 is a perspective diagram illustrating one example of the shape of the three-dimensionally shaped glass of the present invention.

The embodiments of the present invention are described below. However, the present invention is not limited to the embodiments described below. In the following drawings, members and regions having the same actions may be described by assigning the same symbols thereto, and duplicated descriptions thereof may be omitted or simplified. In addition, the embodiments in the drawings are schematically illustrated for clearly describing the present invention and not always show the actual size or scale exactly.

In the present description, the numerical range expressed using "to" is used in the meaning of including numerical values described before and after it as the lower limit value and the upper limit value.

In the present description, the "amorphous glass" and the "crystallized glass" are collectively referred to as "glass".

In the present description, the "amorphous glass" means a glass in which a diffraction peak indicating a crystal cannot be observed by a powder X-ray diffraction method.

In the present description, the "crystallized glass" is a glass obtained by heating the "amorphous glass" to precipitate a crystal therein and means a glass containing a crystal.

In powder X-ray diffractometry, a region where 2θ is from 10° to 80° is measured using CuKα radiation, and when a diffraction peak appears, a precipitated crystal is identified by, for example, a Hanawalt method.

In the present description, the "chemically strengthened glass" means a glass having been subjected to a chemical strengthening treatment, and the "glass for chemical strengthening" means a glass before being subjected to a chemical strengthening treatment.

Furthermore, in the present description, the "base composition of a chemically strengthened glass" means a glass composition of a glass for chemical strengthening. Unless an immoderate ion exchange treatment is performed, a glass composition of a part deeper than a depth of a compressive stress layer (DOL) in a chemically strengthened glass is the same as the base composition of the chemically strengthened glass.

In the present description, unless otherwise indicated, the glass composition is expressed in mass % on an oxide basis, and mass % is simply written as "%".

In the present description, the "substantially free of" means that the content is not higher than a level of impurities contained in raw materials or the like, i.e., the substance is not intentionally added. In the present description, when the "substantially free of a certain component" is stated, the content of the component is specifically, for example, less than 0.1%.

In the present description, the "stress profile" means a profile showing a compressive stress value by using a depth from a glass surface as the variable. In the stress profile, the tensile stress is expressed as a negative compressive stress.

The "compressive stress value (CS)" can be measured by thinning a cross section of a glass and analyzing the thinned sample with a birefringence imaging system. The birefringence imaging system includes, for example, a birefringence imaging system Abrio-IM manufactured by Tokyo Instruments, Inc. The value can also be measured by use of scattered-light photoelasticity. In this method, the CS can be measured by making light incident from a surface of a glass and analyzing polarization of the scattered light. The stress meter using scattered-light photoelasticity includes, for example, a scattered-light photoelastic stress meter SLP-1000 manufactured by Orihara Manufacturing Co., Ltd.

The "depth of compressive stress layer (DOL)" is a depth at which the compressive stress value (CS) is zero.

In the following, the surface compressive stress at a depth of DOL/4 is sometimes denoted by $CS_1$, and the compressive stress at a depth of DOL/2 is sometimes denoted by $CS_2$.

In addition, the depth at which the compressive stress value becomes CS/2 is denoted by $DOL_1$, and $m_1$ represented by the following expression is taken as an inclination of the stress profile from the glass surface to the depth $DOL_1$.

$$m_1 = (CS - CS/2)/(0 - DOL_1)$$

$m_2$ represented by the following expression is taken as an inclination of the stress profile from the depth DOL/4 to the depth DOL/2.

$$m_2 = (CS_1 - CS_2)/(DOL/4 - DOL/2)$$

$m_3$ represented by the following expression is taken as an inclination of the stress profile from the depth DOL/2 to the depth DOL.

$$m_3=(CS_2-0)/(DOL/2-DOL)$$

In the present description, the "internal tensile stress (CT)" means a tensile stress value at a depth corresponding to ½ of a sheet thickness t.

In the present description, the "light transmittance" means an average transmittance of light at a wavelength of 380 nm to 780 nm.

In the present description, the "haze value" means a haze value measured with a C illuminant according to JIS K3761: 2000.

In the present description, the "Vickers hardness" is a Vickers hardness (HV0.1) specified in JIS R1610:2003.

In addition, the "fracture toughness value" means an indentation-fracture method (IF method) fracture toughness value specified in JIS R1607:2010.

In the present description, the "three-dimensional shape" means a shape obtained by bending a flat sheet. Incidentally, the three-dimensional shape is not limited to a shape having a uniform thickness as a whole but may be a shape having portions differing in the thickness.

<Three-Dimensionally Shaped Crystallized Glass>

Figure 2:
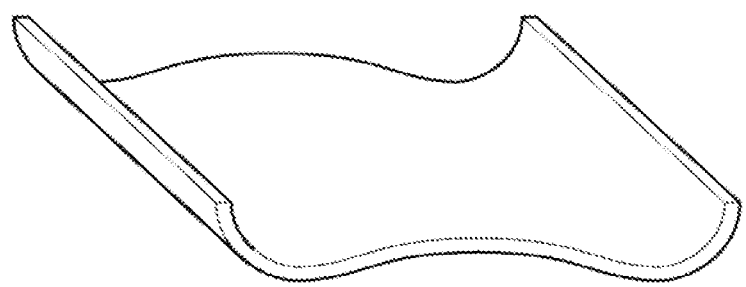
FIG. 2 is a perspective diagram illustrating one example of the shape of the three-dimensionally shaped glass of the present invention.
Figure 3:
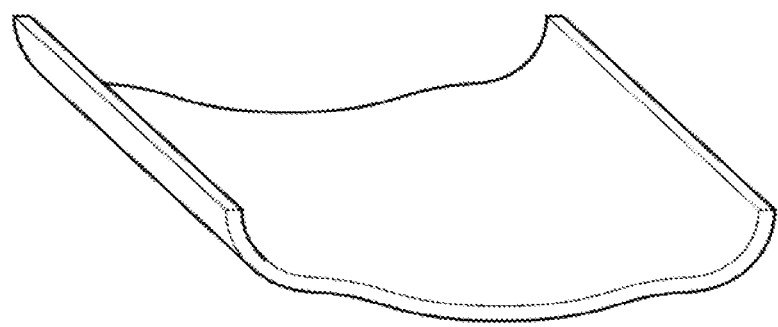
FIG. 3 is a perspective diagram illustrating one example of the shape of the three-dimensionally shaped glass of the present invention.

FIG. 1 is a perspective diagram illustrating one example of the three-dimensionally shaped crystallized glass of the present embodiment (hereinafter, sometimes referred to as "the present three-dimensionally shaped glass"). In FIG. 1, a concave shape is depicted, but the present three-dimensionally shaped glass may have a convex shape. In FIG. 1, a glass having a flat sheet shape in the central part is illustrated, but the present three-dimensionally shaped glass may be curved as a whole. In addition, the present three-dimensionally shaped glass may have a three-dimensional shape composed of a plurality of R shapes as illustrated in FIG. 2 and FIG. 3.

The present three-dimensionally shaped glass has high transparency and therefore, is suitable for a cover glass, etc. in the display part of a mobile terminal, etc. The light transmittance in terms of a thickness of 0.8 mm of the present three-dimensionally shaped glass is preferably 80% or more, because the screen is viewed easily when used for a cover glass of a mobile display, and is more preferably 85% or more, still more preferably 86% or more, particularly preferably 88% or more. The light transmittance of the present three-dimensionally shaped glass in terms of a thickness of 0.8 mm is preferably higher, but it is usually 91% or less, or 90% or less. The light transmittance of 90% is comparable to that of a general amorphous glass.

The haze value of the present three-dimensionally shaped glass in terms of a thickness of 0.8 mm is preferably 1.5% or less, more preferably 1.2% or less, still more preferably 1% or less, yet still more preferably 0.8% or less, and most preferably 0.5% or less. On the other hand, in the case where the haze can hardly be reduced unless the crystallinity is reduced, in order to, e.g., increase the mechanical strength, the haze value of the present three-dimensionally shaped glass in terms of a thickness of 0.8 mm is preferably 0.05% or more, more preferably 0.10% or more.

The present three-dimensionally shaped glass is a crystallized glass and therefore, the strength is high compared with an amorphous glass. In addition, the Vickers hardness is large, and the glass is scratch-resistant.

In order to enhance the abrasion resistance, the Vickers hardness of the present three-dimensionally shaped glass is preferably 680 or more, more preferably 700 or more, and still more preferably 740 or more, yet still more preferably 780 or more, particularly preferably 800 or more.

However, if the Vickers hardness is too large, the processing may become difficult. Therefore, the Vickers hardness of the present three-dimensionally shaped glass is preferably 1,100 or less, more preferably 1,050 or less, still more preferably 1,000 or less.

The crystallized glass (hereinafter, sometimes referred to as "the present crystallized glass") constituting the present three-dimensionally shaped glass contains crystals, and it is preferable to contain a lithium aluminosilicate crystal or a lithium silicate crystal. In the case of containing a lithium aluminosilicate crystal or a lithium silicate crystal, these crystals are also ion-exchanged during a chemical strengthening treatment and therefore, high strength is obtained. Examples of the lithium aluminosilicate crystal include a β-spodumene crystal and a petalite crystal. Examples of the lithium silicate crystal include a lithium metasilicate crystal and a lithium disilicate crystal.

In the case of increasing the strength after chemical strengthening, it is preferable for the present crystallized glass to contain a β-spodumene crystal. In the case of improving the transparency and formability while keeping the chemical strengthening properties, it is preferable for the present crystallized glass to contain a lithium metasilicate crystal.

The β-spodumene crystal is represented by $LiAlSi_2O_6$ and is a crystal showing diffraction peaks at Bragg angles (2θ) of 25.55°±0.05°, 22.71°±0.05°, and 28.20°±0.05° in an X-ray diffraction spectrum.

Figure 4:
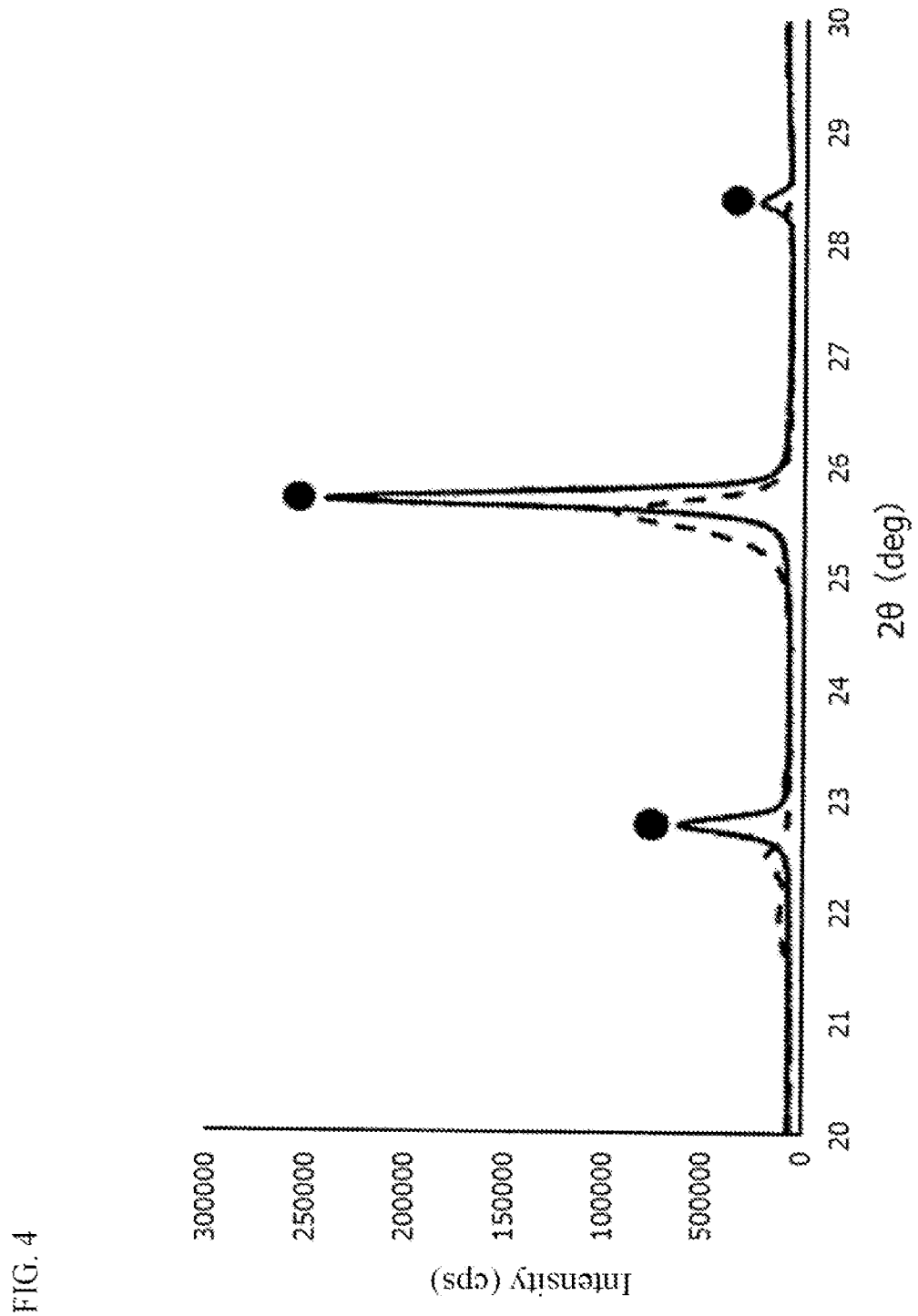
FIG. 4 is a diagram illustrating one example of the X-ray diffraction pattern of the crystallized glass.

FIG. 4 illustrates examples of X-ray diffraction patterns of a crystallized glass (a glass for chemical strengthening) containing a β-spodumene crystal and a crystallized glass (chemically strengthened glass) obtained by chemically strengthening the crystallized glass above. In FIG. 4, the solid line is an X-ray diffraction pattern measured for the crystallized glass sheet before strengthening, and a diffraction line of the β-spodumene crystal indicated by black circles is observed in FIG. 2. The broken line shows an X-ray diffraction pattern measured for the crystallized glass (chemically strengthened glass) sheet after chemical strengthening. It is considered that the positions of diffraction peaks are shifted to the lower angle side by chemical strengthening because the lattice spacing is increased due to occurrence of ion exchange between small ions in the crystal and large ions in the molten salt.

However, when the present inventors compared powder X-ray diffraction patterns before and after chemical strengthening, such a shift of a diffraction line was not observed. The reason therefor is considered because a change in the lattice spacing due to a chemical strengthening treatment occurs only in the vicinity of the surface of the glass sheet and no change is caused in the internal crystals by a chemical strengthening treatment.

In the crystallized glass containing a β-spodumene crystal, the surface compressive stress (CS) tends to be increased by chemical strengthening, compared with a crystallized glass containing other crystals. This may be because the crystal structure of the β-spodumene crystal is dense and therefore, when ions in the precipitated crystal are substituted by larger ion through an ion exchange treatment for chemical strengthening, the compressive stress generated along with a change in the crystal structure increases.

The β-spodumene crystal is known to have a high crystal growth rate. Therefore, in the crystallized glass containing a β-spodumene crystal, the crystals contained therein easily growth and consequently, in many cases, such a glass has low transparency and large haze value. However, since the present three-dimensionally shaped glass contains a large number of microcrystals, the transparency is high and the haze value is small.

Figure 5:
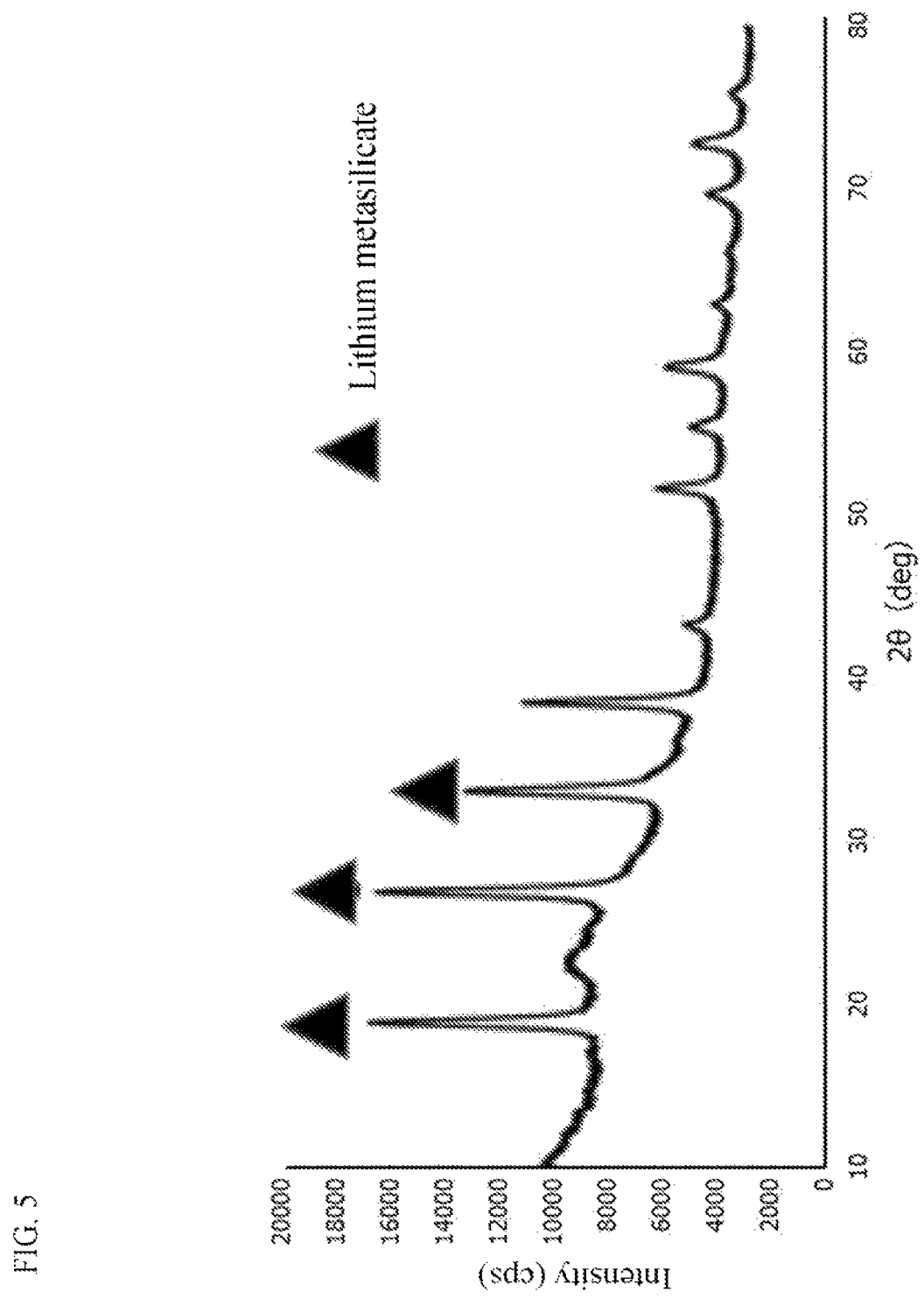
FIG. 5 is a diagram illustrating one example of the X-ray diffraction pattern of the crystallized glass.

The lithium metasilicate crystal is represented by $Li_2SiO_3$ and is a crystal showing diffraction peaks at Bragg angles (2θ) of 26.98°±0.2°, 18.88°±0.2°, and 33.05°±0.2° in an X-ray diffraction spectrum. FIG. 5 illustrates an example of the X-ray diffraction pattern of a crystallized glass containing a lithium metasilicate crystal.

The crystallized glass containing a lithium metasilicate crystal has a high fracture toughness value compared with an amorphous glass, and intense fracture is difficult to occur even when a large compressive stress is formed by chemical strengthening. An amorphous glass capable of precipitating a lithium metasilicate crystal may precipitate a lithium disilicate crystal depending on the heat treatment conditions, etc., and when a lithium metasilicate crystal and a lithium disilicate crystal are contained at the same time, the transparency is reduced. Then, in terms of enhancing the transparency, it is preferred that the crystallized glass containing lithium metasilicate does not contain lithium disilicate. The phrase "does not contain lithium disilicate" as used herein means that in the above-described X-ray diffractometry, a diffraction peak of a lithium disilicate crystal is not observed.

In the case of lowering the bend-forming temperature, the present crystallized glass preferably contains a petalite crystal or a lithium metasilicate crystal. A crystallized glass containing such a crystal has a low crystallization treatment temperature and a low softening temperature and therefore, the forming temperature tends to be easily lowered.

For increasing the mechanical strength, the crystallinity of the present crystallized glass is preferably 10% or more, more preferably 15% or more, still more preferably 20% or more, particularly preferably 25% or more. On the other hand, for enhancing the transparency, the crystallinity of the present crystallized glass is preferably 70% or less, more preferably 60% or less, particularly preferably 50% or less. A low crystallinity is preferable also in terms of that bend-forming or the like is easily performed by heating.

The crystallinity can be calculated from X-ray diffraction intensity by a Rietveld method. The Rietveld method is described in "Handbook of Crystal Analysis" edited by the "Handbook of Crystal Analysis" Editing Committee of the Crystallographic Society of Japan (published by Kyoritsu Shuppan Co., Ltd., 1999, pp. 492-499).

The average particle size of precipitated crystals in the present crystallized glass is preferably 300 nm or less, more preferably 200 nm or less, still more preferably 150 nm or less, and particularly preferably 100 nm or less. The average particle size of precipitated crystals can be calculated from powder X-ray diffraction intensity by the Rietveld method.

The crystallized glass containing a β-spodumene crystal is also known to have a small thermal expansion coefficient. In the case where the present crystallized glass contains β-spodumene, the average thermal expansion coefficient thereof at 50° C. to 350° C. is preferably $30 \times 10^{-7}$/° C. or less, more preferably $25 \times 10^{-7}$/° C. or less, still more preferably $20 \times 10^{-7}$/° C. or less, and particularly preferably $15 \times 10^{-7}$/° C. or less. The average thermal expansion coefficient at 50° C. to 350° C. is usually $10 \times 10^{-7}$/° C. or more.

On the other hand, in the case where the present crystallized glass contains a lithium metasilicate crystal, the average thermal expansion coefficient thereof at 50° C. to 350° C. is preferably $10 \times 10^{-7}$/° C. or more, more preferably $11 \times 10^{-7}$/° C. or more, still more preferably $12 \times 10^{-7}$/° C. or more, and particularly preferably $13 \times 10^{-7}$/° C. or more. If the thermal expansion coefficient is too large, cracking is likely to occur during heat treatment. Accordingly, in the case where the present crystallized glass contains a lithium metasilicate crystal, the average thermal expansion coefficient thereof at 50° C. to 350° C. is preferably $160 \times 10^{-7}$/° C. or less, more preferably $150 \times 10^{-7}$/° C. or less, still preferably $140 \times 10^{-7}$/° C. or less.

The fracture toughness value of the present crystallized glass is preferably 0.8 MPa·m$^{1/2}$ or more, more preferably 1 MPa·m$^{1/2}$ or more. Within this range, fragments are less likely to scatter upon breakage of the strengthened glass.

The Young's modulus of the present crystallized glass is preferably 80 GPa or more, more preferably 86 GPa or more, still more preferably 90 GPa or more, and particularly preferably 100 GPa or more. When the Young's modulus is increased, fragments are less likely to scatter upon breakage of the strengthened glass.

In the case where the present crystallized glass contains a lithium aluminosilicate crystal, the glass preferably includes, in mass % on an oxide basis, from 58 to 74% of $SiO_2$, from 5 to 30% of $Al_2O_3$, from 1 to 14% of $Li_2O$, from 0 to 5% of $Na_2O$, from 0 to 2% of $K_2O$, from 0.5 to 12% in total of either one or more of $SnO_2$ and $ZrO_2$, and from 0 to 6% of $P_2O_5$. In the composition above, it is more preferable to include from 2 to 14% of $Li_2O$, and it is also more preferred that the total ($Na_2O+K_2O$) of the contents of $Na_2O$ and $K_2O$ is from 1 to 5%.

In addition, it is more preferred that the glass includes from 58 to 70% of $SiO_2$, from 15 to 30% of $Al_2O_3$, from 2 to 10% of $Li_2O$, from 0 to 5% of $Na_2O$, from 0 to 2% of $K_2O$, from 0.5 to 6% of $SnO_2$, from 0.5 to 6% of $ZrO_2$, and from 0 to 6% of $P_2O_5$ and $Na_2O+K_2O$ is from 1 to 5%.

In other words, the present three-dimensionally shaped glass is preferably a glass obtained by crystallizing an amorphous glass having the composition above.

In the case where the present crystallized glass contains a lithium silicate crystal, the glass preferably includes, in mass % on an oxide basis, from 45 to 75% of $SiO_2$, from 1 to 20% of $Al_2O_3$, from 10 to 25% of $Li_2O$, from 0 to 12% of $P_2O_5$, from 0 to 15% of $ZrO_2$, from 0 to 10% of $Na_2O$, and from 0 to 5% of $K_2O$.

<Chemically Strengthened Glass>

The present three-dimensionally shaped glass is preferably chemically strengthened. The three-dimensionally shaped chemically strengthened glass of this embodiment (hereinafter, sometimes referred to as "the present strengthened glass") obtained by chemically strengthening the present three-dimensionally shaped glass is described.

The surface compressive stress (CS) of the present strengthened glass is preferably 600 MPa or more, because cracking is hardly caused by deformation such as deflection. The surface compressive stress of the present strengthened glass is more preferably 800 MPa or more.

The depth of compressive stress layer (DOL) of the present strengthened glass is preferably 80 μm or more, because cracking hardly occurs even when the surface is flawed. The DOL of the present strengthened glass is preferably 100 μm or more.

In addition, the maximum depth (hereinafter, sometimes referred to as "50 MPa depth") at which the compressive stress value is 50 MPa or more is preferably 80 μm or more, because cracking hardly occurs even when the glass is dropped on a hard surface such as asphalt. The 50 MPa depth is more preferably 90 μm or more, and particularly preferably 100 μm or more.

In the present strengthened glass, the inclination $m_1$ of the stress profile from the glass surface to the depth $DOL_1$ is preferably −50 MPa/μm or less, more preferably −55 MPa/μm or less, and still more preferably −60 MPa/μm or less. The chemically strengthened glass is a glass having a compressive stress layer formed in the surface. Since a tensile stress is generated in a portion far from the surface, the stress profile thereof has a negative inclination from the surface at a depth of zero toward the inside. Accordingly, $m_1$ is a negative value, and when an absolute value thereof is large, a stress profile having a large surface compressive stress CS and a small internal tensile stress CT is obtained.

The inclination $m_2$ of the stress profile from a depth of DOL/4 to a depth of DOL/2 has a negative value. In order to suppress scattering of fragments upon breakage of the strengthened glass, the inclination $m_2$ is preferably −5 MPa/μm or more, more preferably −3 MPa/μm or more, and still more preferably −2 MPa/μm or more. If $m_2$ is too large, the 50 MPa depth is reduced, and there is a concern that the drop strength to asphalt may lack. In order to increase the 50 MPa depth, $m_2$ is preferably −0.3 MPa/μm or less, more preferably −0.5 MPa/μm or less, and still more preferably −0.7 MPa/μm or less.

In the present strengthened glass, the inclination $m_3$ of the stress profile from a depth of DOL/2 to DOL has a negative value. In order to suppress scattering of fragments upon breakage of the strengthened glass, $m_3$ is preferably −5 MPa/μm or more, more preferably −4 MPa/μm or more, still more preferably −3.5 MPa/μm or more, and particularly preferably −2 MPa/μm or more. If the absolute value of $m_3$ is too small, the 50 MPa depth is reduced, and cracking is likely to occur when the glass is flawed. In order to increase the 50 MPa depth, $m_3$ is preferably −0.3 MPa/μm or less, more preferably −0.5 MPa/μm or less, and still more preferably −0.7 MPa/μm or less.

The ratio $m_2/m_3$ of the inclination $m_2$ to the inclination $m_3$ is preferably 2 or less, because deep DOL and small CT are obtained. The ratio $m_2/m_3$ is more preferably 1.5 or less, and still more preferably 1 or less. In order to prevent occurrence of cracks in an end face of the strengthened glass, the ratio $m_2/m_3$ is preferably 0.3 or more, more preferably 0.5 or more, and still more preferably 0.7 or more.

The internal tensile stress (CT) of the present strengthened glass is preferably 110 MPa or less, because fragments are less likely to scatter upon breakage of the strengthened glass. The CT is more preferably 100 MPa or less, still more preferably 90 MPa or less. On the other hand, when the CT is reduced, the CS is also reduced, resulting in a tendency that sufficient strength is difficult to be obtained. Therefore, the CT is preferably 50 MPa or more, more preferably 55 MPa or more, and still more preferably 60 MPa or more.

The four point bending strength of the present strengthened glass is preferably 900 MPa or more.

Here, the four point bending strength is measured using a test piece of 40 mm×5 mm×0.8 mm under the conditions of a lower span of 30 mm, an upper span of 10 mm and a cross head speed of 0.5 mm/min. An average value of 10 test pieces is taken as the four point bending strength.

The light transmittance and haze value of the present strengthened glass are substantially the same as those of the three-dimensionally shaped glass before chemical strengthening and therefore, descriptions thereof are omitted. In addition, as with the three-dimensionally shaped glass before chemical strengthening, it is preferable for the present strengthened glass to contain a β-spodumene crystal.

The Vickers hardness of the present strengthened glass tends to be larger than that of the three-dimensionally shaped glass before strengthening.

The Vickers hardness of the present strengthened glass is preferably 720 or more, more preferably 740 or more, still more preferably 780 or more, and yet still more preferably 800 or more. On the other hand, the Vickers hardness of the present strengthened glass is usually 950 or less.

<Glass Composition>

Here, the glass composition of the present crystallized glass is described. The composition of the present crystallized glass is as a whole the same as the composition of the amorphous glass before crystallization treatment.

In addition, the present strengthened glass is obtained by chemically strengthening the present three-dimensionally shaped glass composed of the present crystallized glass and unless an immoderate ion exchange treatment is performed, the composition of the present strengthened glass is as a whole the same as the composition of the present crystallized glass described below.

The present crystallized glass includes, in mass % on an oxide basis, from 45 to 74% of $SiO_2$, from 1 to 30% of $Al_2O_3$, from 1 to 25% of $Li_2O$, from 0 to 10% of $Na_2O$, from 0 to 5% of $K_2O$, from 0 to 15% in total of either one or more of $SnO_2$ and $ZrO_2$, and from 0 to 12% of $P_2O_5$.

In the case where the present crystallized glass contains a lithium aluminosilicate crystal, the glass preferably includes, in mass % on an oxide basis, from 58 to 74% of $SiO_2$, from 5 to 30% of $Al_2O_3$, from 1 to 14% of $Li_2O$, from 0 to 5% of $Na_2O$, from 0 to 2% of $K_2O$, from 0.5 to 12% in total of either one or more of $SnO_2$ and $ZrO_2$, and from 0 to 6% of $P_2O_5$. In the composition above, it is more preferable to include from 2 to 14% of $Li_2O$, and it is also more preferred that the total ($Na_2O+K_2O$) of the contents of $Na_2O$ and $K_2O$ is from 1 to 5%.

In addition, it is still more preferred that the glass includes, in mass % on an oxide basis, from 58 to 70% of $SiO_2$, from 15 to 30% of $Al_2O_3$, from 2 to 10% of $Li_2O$, from 0 to 5% of $Na_2O$, from 0 to 2% of $K_2O$, from 0.5 to 6% of $SnO_2$, from 0.5 to 6% of $ZrO_2$, and from 0 to 6% of $P_2O_5$ and $Na_2O+K_2O$ is from 1 to 5%.

In the case where the present crystallized glass contains a lithium silicate crystal, the glass preferably includes, in mass % on an oxide basis, from 45 to 75% of $SiO_2$, from 1 to 20% of $Al_2O_3$, from 10 to 25% of $Li_2O$, from 0 to 12% of $P_2O_5$, from 0 to 15% of $ZrO_2$, from 0 to 10% of $Na_2O$, and from 0 to 5% of $K_2O$.

These preferable glass compositions are described below.

$SiO_2$ is a component forming a network structure of the glass. In addition, $SiO_2$ is a component enhancing the chemical durability, is a constituent component of a lithium aluminosilicate crystal, and is also a constituent component of a lithium silicate crystal. The content of $SiO_2$ is 45% or more, preferably 50% or more, and more preferably 55% or more. In the case of increasing particularly the strength, the content of $SiO_2$ is preferably 58% or more, more preferably 60% or more, and still more preferably 64% or more. On the other hand, if the content of $SiO_2$ is too large, the meltability decreases significantly. Therefore, the content of $SiO_2$ is 74% or less, preferably 70% or less, more preferably 68% or less, and still more preferably 66% or less.

$Al_2O_3$ is a component effective in increasing the surface compressive stress generated by chemical strengthening, and is essential. $Al_2O_3$ is a constituent component of a lithium aluminosilicate crystal. The content of $Al_2O_3$ is 1% or more, preferably 2% or more, more preferably 5% or more, and still more preferably 8% or more. In the case of precipitating a β-spodumene crystal, the content of $Al_2O_3$ is more preferably 15% or more, and still more preferably 20% or more. On the other hand, if the content of $Al_2O_3$ is too large, the devitrification temperature of the glass rises. The content of $Al_2O_3$ is 30% or less, and preferably 25% or less. In order to lower the forming temperature, the content of $Al_2O_3$ is more preferably 20% or less, and still more preferably 15% or less.

$Li_2O$ is a component forming a surface compressive stress by the effect of ion exchange, is a constituent component of a lithium aluminosilicate crystal and a lithium silicate crystal, and is essential.

The content of $Li_2O$ is 1% or more, preferably 2% or more, more preferably 4% or more. For increasing the precipitated amount of lithium metasilicate crystal, the content of $Li_2O$ is more preferably 10% or more, still more preferably 15% or more, and particularly preferably 20% or more. In the case of lithium metasilicate, the content of $Li_2O$ is preferably 25% or less, more preferably 22% or less, and still more preferably 20% or less. On the other hand, for precipitating a lithium aluminosilicate crystal, the content of $Li_2O$ is preferably 14% or less, and in the case of precipitating a β-spodumene crystal, the content is preferably 10% or less, more preferably 8% or less, and still more preferably 6% or less.

In the case where the present crystallized glass contains a β-spodumene crystal, the content ratio $Li_2O/Al_2O_3$ of $Li_2O$ and $Al_2O_3$ is preferably 0.3 or less, because the transparency is improved.

$Na_2O$ is a component improving the meltability of the glass.

Although $Na_2O$ is not essential, the content of $Na_2O$ in the present crystallized glass is preferably 0.5% or more, and more preferably 1% or more. If the content of $Na_2O$ is too large, a lithium aluminosilicate crystal or lithium silicate crystal becomes difficult to be precipitated, or the chemical strengthening properties are deteriorated. Therefore, the content of $Na_2O$ in the present crystallized glass is preferably 15% or less, more preferably 12% or less, and still more preferably 10% or less. For precipitating a β-spodumene crystal, the content of $Na_2O$ is preferably 5% or less, more preferably 4% or less, and still more preferably 3% or less.

As with $Na_2O$, $K_2O$ is a component lowering the melting temperature of the glass and may be contained. In the case where the present crystallized glass contains $K_2O$, the content thereof is preferably 0.5% or more, and more preferably 1% or more. For lowering the forming temperature, the content of $K_2O$ is more preferably 1.5% or more, and still more preferably 2% or more.

The total content $Na_2O+K_2O$ of $Na_2O$ and $K_2O$ is preferably 1% or more, and more preferably 2% or more.

If the content of $K_2O$ is too large, the chemical strengthening properties are deteriorated. Therefore, in the case where the present crystallized glass contains $K_2O$, the content thereof is preferably 8% or less, more preferably 7% or less, still more preferably 6% or less, and particularly preferably 5% or less. In order to facilitate the precipitation of a lithium aluminosilicate crystal, the content of $K_2O$ is preferably 2% or less. In this case, if the total content $Na_2O+K_2O$ of $Na_2O$ and $K_2O$ is excessively large, there is a concern that the transparency may be deteriorated. For enhancing the transparency, the total content is preferably 5% or less, more preferably 4% or less, and still more preferably 3% or less.

In the crystallized glass containing lithium metasilicate, in order to satisfy both the chemical strengthening properties and the precipitation of a lithium metasilicate crystal, the content of $K_2O$ is preferably 4% or less, more preferably 3% or less, and particularly preferably 2% or less.

Both $ZrO_2$ and $SnO_2$ are not essential but are a component constituting a crystal nucleus at the time of crystallization treatment, and it is preferable to contain either one or more of these. In order to produce a crystal nucleus, the total content $SnO_2+ZrO_2$ of $SnO_2$ and $ZrO_2$ is preferably 0.5% or more, and more preferably 1% or more. In order to form a large number of crystal nuclei and thereby enhance the transparency, the total content is preferably 3% or more, more preferably 4% or more, still more preferably 5% or more, particularly preferably 6% or more, and most preferably 7% or more. In order to precipitate lithium metasilicate, it is preferable to contain $ZrO_2$. In this case, the content of $ZrO_2$ is preferably 1% or more, more preferably 2% or more, still more preferably 4% or more, particularly preferably 6% or more, and most preferably 7% or more. Furthermore, in order to suppress devitrification during glass melting, the $SnO_2+ZrO_2$ is preferably 15% or less, and more preferably 14% or less. For making a defect due to unmelted material difficult to occur in the glass, the total content is preferably 12% or less, more preferably 10% or less, still more preferably 9% or less, and particularly preferably 8% or less.

In the case of precipitating a β-spodumene crystal, the content of $SnO_2$ is preferably 0.5% or more, more preferably 1% or more, and still more preferably 1.5% or more. The content of $SnO_2$ is preferably 6% or less, because a defect due to an unmelted material is difficult to occur in the glass, and the content is more preferably 5% or less, still more preferably 4% or less.

$SnO_2$ is also a component enhancing the solarization resistance. In order to suppress solarization, the content of $SnO_2$ is preferably 1% or more, and more preferably 1.5% or more.

In the case of precipitating a β-spodumene crystal, the content of $ZrO_2$ is preferably 0.5% or more, more preferably 1% or more. In this case, if the content of $ZrO_2$ exceeds 6%, devitrification readily occurs during melting, and the quality of the chemically strengthened glass may be deteriorated. The content of $ZrO_2$ is preferably 6% or less, more preferably 5% or less, and still more preferably 4% or less.

In the crystallized glass containing lithium metasilicate, for the precipitation of a lithium metasilicate crystal, the $ZrO_2$ content is preferably 1% or more, more preferably 2% or more, still more preferably 4% or more, particularly preferably 6% or more, and most preferably 7% or more. However, for suppressing devitrification during melting, the content of $ZrO_2$ is preferably 15% or less, more preferably 14% or less, still more preferably 12% or less, and particularly preferably 11% or less.

In the case of precipitating a β-spodumene crystal and containing both $SnO_2$ and $ZrO_2$, in order to enhance the transparency, the ratio $SnO_2/(SnO_2+ZrO_2)$ of the $SnO_2$ amount to the total amount of the both is preferably 0.3 or more, more preferably 0.35 or more, and still more preferably 0.45 or more.

On the other hand, in order to increase the strength, the $SnO_2/(SnO_2+ZrO_2)$ is preferably 0.7 or less, more preferably 0.65 or less, and still more preferably 0.60 or less.

$TiO_2$ serves as a component forming a crystal nucleus of the crystallized glass and therefore may be contained. In the case of precipitating a β-spodumene crystal and containing $TiO_2$, the content thereof is preferably 0.1% or more, more preferably 0.15% or more, and still more preferably 0.2% or more. On the other hand, if the content of $TiO_2$ exceeds 5%, devitrification readily occurs during melting, and the quality of the chemically strengthened glass may be deteriorated.

Therefore, the content is preferably 5% or less, more preferably 3% or less, and still more preferably 1.5% or less.

In the case of precipitating a lithium metasilicate crystal and containing $TiO_2$, the content thereof is preferably 0.5% or more, more preferably 0.1% or more, still more preferably 2% or more, particularly preferably 3% or more, and most preferably 4% or more. On the other hand, if the content of $TiO_2$ exceeds 10%, devitrification readily occurs during melting, and the quality of the chemically strengthened glass may be deteriorated. Therefore, the content is preferably 10% or less, more preferably 8% or less, and still more preferably 6% or less.

In the case where $Fe_2O_3$ is contained in glass and the glass contains $TiO_2$, a composite called an ilmenite composite is formed, and yellow or brown coloring is likely to occur. $Fe_2O_3$ is normally contained as impurity in glass and therefore, in order to prevent coloring, the content of $TiO_2$ is preferably 1% or less, more preferably 0.5% or less, still more preferably 0.25% or less, and it is particularly preferable that the glass is substantially free of $TiO_2$.

$P_2O_5$ is not essential but has an effect of encouraging phase separation of the glass and promoting the crystallization and therefore, may be contained. In the case of containing $P_2O_5$, its content is preferably 0.1% or more, more preferably 0.5% or more, still more preferably 1% or more, and particularly preferably 2% or more. In the case of precipitating a lithium metasilicate crystal, the content of $P_2O_5$ is more preferably 4% or more, still more preferably 5% or more, and particularly preferably 6% or more. On the other hand, if the content of $P_2O_5$ is large, acid resistance is deteriorated. Accordingly, the content of $P_2O_5$ is 15% or less, preferably 14% or less, more preferably 12% or less, still more preferably 11% or less, yet still more preferably 10% or less, particularly preferably 8% or less, and most preferably 7% or less. In the case of a chemically strengthened glass containing a β-spodumene crystal, in order to make fragments less likely scatter upon breakage, the content of $P_2O_5$ is preferably 6% or less, more preferably 5% or less, still more preferably 4% or less, particularly preferably 3% or less, and most preferably 2% or less. In the case of placing importance on the acid resistance, it is preferable to be substantially free of $P_2O_5$.

$B_2O_3$ is a component enhancing the chipping resistance and meltability of the glass for chemical strengthening or the chemically strengthened glass and may be contained. Although $B_2O_3$ is not essential, in the case of containing $B_2O_3$, the content thereof is preferably 0.5% or more, more preferably 1% or more, still more preferably 2% or more, for enhancing the meltability. On the other hand, if the content of $B_2O_3$ exceeds 5%, striae are generated during melting and the quality of the glass for chemical strengthening is easily deteriorated. Therefore, the content of $B_2O_3$ is preferably 5% or less, more preferably 4% or less, still more preferably 3% or less, and particularly preferably 1% or less. In order to increase the acid resistance, it is preferable to be substantially free of $B_2O_3$.

MgO is a component increasing the surface compressive stress of the chemically strengthened glass, is a component suppressing scattering of fragments upon breakage of the chemically strengthened glass, and may be contained. In the case of containing MgO, its content is preferably 0.5% or more, and more preferably 1% or more. On the other hand, in order to suppress devitrification during melting, the content of MgO is preferably 5% or less, more preferably 4% or less, and still more preferably 3% or less.

CaO is a component enhancing the meltability of the glass and may be contained so as to prevent devitrification during melting and enhance the meltability while suppressing a rise in the thermal expansion coefficient. In the case of containing CaO, the content thereof is preferably 0.5% or more, and more preferably 1% or more. On the other hand, in order to enhance the ion exchange properties, the content of CaO is preferably 4% or less, more preferably 3% or less, and particularly preferably 2% or less.

SrO is a component enhancing the meltability of the glass, is also a component enhancing the refractive index of the glass to make the refractive index of the residual glass phase after crystallization close to the refractive index of the precipitated crystal, thereby improving the light transmittance of the crystallized glass. Therefore, SrO may be contained. In the case of containing SrO, the content thereof is preferably 0.1% or more, more preferably 0.5% or more, and still more preferably 1% or more. On the other hand, if the content of SrO is too large, the ion exchange rate decreases. Accordingly, the content of SrO is preferably 3% or less, more preferably 2.5% or less, still more preferably 2% or less, and particularly preferably 1% or less.

BaO is a component enhancing the meltability of the glass, is also a component enhancing the refractive index of the glass to make the refractive index of the residual glass phase after crystallization close to the refractive index of the lithium aluminosilicate crystal phase, thereby improving the light transmittance of the crystallized glass. Therefore, BaO may be contained. In the case of containing BaO, the content thereof is preferably 0.1% or more, more preferably 0.5% or more, and still more preferably 1% or more. On the other hand, if the BaO content is too large, the ion exchange rate decreases. Accordingly, the content of BaO is preferably 3% or less, more preferably 2.5% or less, still more preferably 2% or less, and particularly preferably 1% or less.

ZnO is a component decreasing the thermal expansion coefficient of the glass and increasing the chemical durability, is also a component enhancing the refractive index of the glass to make the refractive index of the residual glass phase after crystallization close to the refractive index of the lithium aluminosilicate crystal phase, thereby improving the light transmittance of the crystallized glass. Therefore, ZnO may be contained. In the case of containing ZnO, the content thereof is preferably 0.5% or more, more preferably 1% or more, still more preferably 1.5% or more, and particularly preferably 2% or more. On the other hand, for suppressing devitrification during melting, the content of ZnO is preferably 4% or less, more preferably 3% or less, and still more preferably 2% or less.

All of $Y_2O_3$, $La_2O_3$, $Nb_2O_5$ and $Ta_2O_5$ are effective in preventing fragments from scattering upon breakage of the glass and may be contained so as to increase the refractive index. In the case of containing these components, the total $Y_2O_3+La_2O_3+Nb_2O_5$ of the contents of $Y_2O_3$, $La_2O_3$ and $Nb_2O_5$ is preferably 0.5% or more, more preferably 1% or more, still more preferably 1.5% or more, and particularly preferably 2% or more. Furthermore, for the reason that the glass is less likely to devitrify during melting, $Y_2O_3+La_2O_3+Nb_2O_5$ is preferably 4% or less, more preferably 3% or less, still more preferably 2% or less, and particularly preferably 1% or less.

The total content $Y_2O_3+La_2O_3+Nb_2O_5+Ta_2O_5$ of $Y_2O_3$, $La_2O_3$, $Nb_2O_5$ and $Ta_2O_5$ is preferably 0.5% or more, more preferably 1% or more, still more preferably 1.5% or more, and particularly preferably 2% or more. Furthermore, for the reason that the glass is less likely to devitrify during melting, $Y_2O_3+La_2O_3+Nb_2O_5+Ta_2O_5$ is preferably 4% or less, more preferably 3% or less, still more preferably 2% or less, and particularly preferably 1% or less.

In addition, $CeO_2$ may be contained. $CeO_2$ is effective in oxidizing glass. In the case of containing a large amount of $SnO_2$, $CeO_2$ may inhibit $SnO_2$ from being reduced to SnO that is a coloring component, thereby suppressing coloring. In the case of containing $CeO_2$, the content thereof is preferably 0.03% or more, more preferably 0.05% or more, and still more preferably 0.07% or more. In the case of using $CeO_2$ as an oxidizer, if the content of $CeO_2$ is too large, the glass is readily colored. Therefore, for enhancing the transparency, the content of $CeO_2$ is preferably 1.5% or less, and more preferably 1.0% or less.

Furthermore, as long as the attainment of desired chemical strengthening properties is not impeded, a coloring component may be added. Preferable examples of coloring components include $Co_3O_4$, $MnO_2$, $Fe_2O_3$, NiO, CuO, $Cr_2O_3$, $V_2O_5$, $Bi_2O_3$, $SeO_2$, $Er_2O_3$, and $Nd_2O_3$.

The content of the coloring components is preferably 1% or less in total. In the case of increasing the light transmittance of the glass, it is preferable that the glass is substantially free of these components.

In addition, $SO_3$, a chloride, a fluoride, etc. may be appropriately contained as a refining agent at the time of glass melting. It is preferable not to contain $As_2O_3$. In the case of containing $Sb_2O_3$, the content thereof is preferably 0.3% or less, more preferably 0.1% or less, and most preferably nil.

<Production Method of Glass for Chemical Strengthening>

The production method of a glass for chemical strengthening of this embodiment is a production method of a glass for chemical strengthening including heating and crystallizing an amorphous glass and bend-forming the resulting present crystallized glass under heating. The present three-dimensionally shaped glass can be produced by the production method of a glass for chemical strengthening of the present invention.

In addition, the production method of a chemically strengthened glass of this embodiment is a production method of a chemically strengthened glass including heating and crystallizing an amorphous glass, bend-forming the resulting present crystallized glass under heating, and thereafter chemically strengthening the glass. The three-dimensionally shaped chemically strengthened glass of this embodiment is obtained by the production method of a chemically strengthened glass of this embodiment.

(Production of Amorphous Glass)

The amorphous glass can be produced, for example, by the following method. Note that the following production method is an example of producing a sheet-like chemically strengthened glass.

Glass raw materials are prepared to obtain a glass having a desired composition, and heated and melted in a glass melting furnace. After that, the molten glass is homogenized by bubbling, stirring, addition of a refining agent, etc., then formed into a glass sheet with a predetermined thickness by a known forming method, and annealed. Alternatively, the molten glass may be formed into a sheet by a method in which the molten glass is formed into a block, annealed, and then cut.

Examples of the forming method of the sheet-like glass include a float process, a press process, a fusion process, and a down draw process. Particularly in the case of producing a large-size glass sheet, a float process is preferred. In addition, a continuously forming method other than a float process, for example, a fusion process or a down draw process, is also preferred.

(Crystallization Treatment)

A crystallized glass is obtained by heat-treating the amorphous glass obtained by the procedure above.

The heating treatment is preferably a two-step heating treatment in which the temperature is raised from room temperature to a first treatment temperature, followed by holding for a given time, and then raised to a second treatment temperature higher than the first treatment temperature, followed by holding for a given time. The heating treatment is also preferably a three-step heating treatment in which the temperature is raised from room temperature to a first treatment temperature, followed by holding for a given time, then raised to a second treatment temperature higher than the first treatment temperature, followed by holding for a given time, and further raised to a third treatment temperature higher than the second treatment temperature, followed by holding for a given time.

In the case of the two-step heating treatment, the first treatment temperature is preferably within a temperature range at which the crystal nucleation rate increases in the glass composition, and the second treatment temperature is preferably within a temperature range at which the crystal growth rate increases in the glass composition. In addition, the holding time at the first treatment temperature is preferably long enough to produce a sufficient number of crystal nuclei. When a large number of crystal nuclei are produced, the size of each crystal is reduced and consequently a crystallized glass having high transparency is obtained.

The first treatment temperature is, for example, from 550 to 800° C., and the second treatment temperature is, for example, from 850 to 1,000° C. The first treatment temperature is held for 2 to 10 hours, and the second treatment temperature is then held for 2 to 10 hours.

The crystallized glass obtained by the procedure above is ground and polished as necessary, to form a crystallized glass sheet. In the case where the crystallized glass sheet is cut into a predetermined shape and size or chamfered, cutting or chamfering is preferably performed before applying a chemical strengthening treatment, because a compressive stress layer is formed also on the end face by the later chemical strengthening treatment.

(Bend-Forming)

As for the bend-forming method, any method can be selected from existing bend-forming methods such as self-weight forming method, vacuum forming method and press forming method. Two or more kinds of bend-forming methods may be used in combination.

The self-weight forming method is a method in which a glass sheet is placed on a forming mold and the glass sheet is heated, then made to fit the forming mold by gravity to be bend-formed into a predetermined shape.

The vacuum forming method is a method in which a glass sheet is placed on a forming mold and after the periphery of the glass sheet is sealed, a space between the forming mold and the glass sheet is depressurized to apply a differential pressure between the front and back surfaces of the glass sheet so as to perform bend-forming. On this occasion, a pressure may be supplementarily applied to the upper surface side of the glass sheet.

The press forming is a method in which a glass sheet is placed between forming molds (upper mold and lower mold) and the glass sheet is heated and bend-formed into a predetermined shape by applying a press load between the upper and lower molds.

In any case, the glass is deformed by applying a force while the glass is heated.

The bend-forming (thermal bending) temperature is, for example, from 700 to 1,100° C., and preferably from 750 to 1,050° C. In view of dimension accuracy, the thermal bending temperature is preferably high relative to the maximum temperature of the crystallization treatment because thermal deformation readily occurs. The difference between the maximum temperature of the crystallization treatment and the thermal bending temperature is preferably 10° C. or more, and more preferably 30° C. or more. On the other hand, if the thermal bending temperature is too high relative to the crystallization treatment temperature, the light transmittance may be deteriorated by the bend-forming. Accordingly, the difference between the maximum temperature of the crystallization treatment and the thermal bending temperature is preferably 120° C. or less, more preferably 100° C. or less, still more preferably 90° C. or less, and particularly preferably 60° C. or less.

The decrease of light transmittance by bend-forming is preferably 3% or less, more preferably 2% or less, still more preferably 1.5% or less, and particularly preferably 1% or less.

In addition, for keeping the transparency of the final glass high, a higher light transmittance before thermal bending is advantageous, and the light transmittance in terms of a thickness of 0.8 mm is preferably 85% or more, more preferably 87% or more, and particularly preferably 89% or more.

(Chemical Strengthening Treatment)

The chemical strengthening treatment is a treatment in which a glass is brought into contact with a metal salt by a method of, for example, immersing the glass in a metal salt (e.g., potassium nitrate) melt containing a metal ion having a large ionic radius (typically, Na ion or K ion), and a metal ion having a small ionic radius (typically Na ion or Li ion) in the glass is thereby replaced by a metal ion having a large ionic radius (typically Na ion or K ion for Li ion, and K ion for Na ion).

In order to increase the rate of the chemical strengthening treatment, it is preferable to use "Li—Na exchange" of replacing Li ion in the glass by Na ion. Furthermore, in order to form a large compressive stress by ion exchange, it is preferable to use "Na—K exchange" of replacing Na ion in the glass by K ion.

Examples of the molten salt for performing the chemical strengthening treatment include a nitrate, a sulfate, a carbonate, and a chloride. Among these, examples of the nitrate include lithium nitrate, sodium nitrate, potassium nitrate, cesium nitrate, and silver nitrate. Examples of the sulfates include lithium sulfate, sodium sulfate, potassium sulfate, cesium sulfate, and silver sulfate. Examples of the carbonate include lithium carbonate, sodium carbonate, and potassium carbonate. Examples of the chloride include lithium chloride, sodium chloride, potassium chloride, cesium chloride, and silver chloride. One of these molten salts may be used alone, or a plurality of kinds thereof may be used in combination.

The treatment conditions such as time and temperature of the chemical strengthening treatment may be appropriately selected while taking into account the glass composition, the kind of molten salt, etc.

The present strengthened glass is preferably obtained, for example, by the following two-step chemical strengthening treatment.

First, the present three-dimensionally shaped glass is immersed in an Na ion-containing metal salt (e.g., sodium nitrate) at approximately from 350 to 500° C. for approximately from 0.1 to 10 hours. This causes ion exchange between Li ion in the present three-dimensionally shaped glass and Na ion in the metal salt, and for example a compressive stress layer having a surface compressive stress of 200 MPa or more and a depth of compressive stress layer of 80 µm or more can thereby be formed. If the surface compressive stress introduced by this treatment exceeds 1,000 MPa, it is difficult to increase DOL while keeping CT low in the finally obtained present strengthened glass. Accordingly, the surface compressive stress introduced by this treatment is preferably 900 MPa or less, more preferably 700 MPa or less, and still more preferably 600 MPa or less.

Next, the glass after the treatment above is immersed in a K ion-containing metal salt (e.g., potassium nitrate) at approximately from 350 to 500° C. for approximately from 0.1 to 10 hours. A large compressive stress is consequently generated, for example, in a portion at a depth of about 10 µm or less of the compressive stress layer formed in the previous treatment.

According to such a two-step treatment, a favorable stress profile with a surface compressive stress of 600 MPa or more is likely to be obtained.

The glass may be immersed in the K ion-containing metal salt after the glass is first immersed in the Na ion-containing metal salt and then held at 350 to 500° C. in the atmosphere for 1 to 5 hours. The holding temperature is preferably from 425 to 475° C., and more preferably from 440 to 460° C.

Holding at a high temperature in the atmosphere allows Na ions introduced inside the glass from the metal salt by the first treatment to thermally diffuse in the glass, leading to formation of a more favorable stress profile.

Alternatively, instead of holding in the atmosphere after immersion in an Na ion-containing metal salt, the glass may be immersed in a metal salt containing Na ion and Li ion (for example, a mixed salt of sodium nitrate and lithium nitrate) at 350 to 500° C. for 0.1 to 20 hours.

Immersion in the metal salt containing Na ion and Li ion causes ion exchange between Na ion in the glass and Li ion in the metal salt to form a more favorable stress profile, thereby improving the drop strength to asphalt.

In the case of performing such a two-step or three-step strengthening treatment, in view of production efficiency, the total treatment time is preferably 10 hours or less, more preferably 5 hours or less, and still more preferably 3 hours or less. On the other hand, in order to obtain a desired stress profile, the total treatment time needs to be 0.5 hours or more, and more preferably 1 hour or more.

The three-dimensionally shaped chemically strengthened glass of the present embodiment obtained in the above-described manner is useful particularly as a cover glass used, for example, in a mobile device such as cell phone and smartphone. The glass is also useful for a cover glass of a display device not intended to be portable, such as television, personal computer and touch panel. The glass is also useful as a cover glass of, for example, an interior decoration of a car, an airplane, etc.

EXAMPLE

The present invention is described below by referring to Examples, but the present invention is not limited thereto.

Glass raw materials of each of Glasses 1 to 8 were prepared to give a glass composition shown by mass % on an oxide basis in Table 1, and weighed so that 800 g of a glass can be obtained. Subsequently, the mixed glass raw materials were put in a platinum crucible, charged into an electric furnace at 1,500 to 1,700° C., melted for about 5 hours, degassed, and homogenized.

The obtained molten glass was cast into a mold, held for 1 hour at a temperature 30° C. higher than the glass transition point, and then cooled down to room temperature at a rate of 0.5° C./min to obtain a glass block.

(Glass Transition Point)

Based on JIS R1618:2002, a thermal expansion curve was obtained using a thermal dilatometer (TD5000SA made by Bruker AXS GmbH.) by setting the temperature riserate to 10° C./min. In addition, a glass transition point Tg [unit: ° C.] was determined from the obtained thermal expansion curve. The results are shown in Table 1. In the Table, the blank indicates unevaluated.

(Thermal Expansion Coefficient)

A thermal expansion curve was obtained using a thermal dilatometer (TD5000SA manufactured by Bruker AXS GmbH.) by setting the temperature rise rate at 10° C./min. In addition, an average linear thermal expansion coefficient [unit: $\times 10^{-7}$/° C.] at 50° C. to 350° C. was measured from the obtained thermal expansion curve.

(Precipitated Crystal)

Powder X-ray diffraction was measured under the following conditions to identify the precipitated crystal (main crystal). In addition, crystallinity (degree of crystallinity) [unit: %] and crystal grain size (crystal size) [unit: nm] were

TABLE 1

|  | Glass 1 | Glass 2 | Glass 3 | Glass 4 | Glass 5 | Glass 6 | Glass 7 | Glass 8 |
|---|---|---|---|---|---|---|---|---|
| $SiO_2$ | 65.4 | 62.9 | 66.1 | 73.6 | 59.5 | 57.7 | 53.8 | 51.2 |
| $Al_2O_3$ | 22.4 | 22.4 | 21.0 | 7.6 | 2.0 | 2.0 | 7.2 | 8.7 |
| $Li_2O$ | 4.3 | 4.3 | 1.9 | 11.2 | 18.4 | 18.5 | 18.1 | 17.4 |
| $Na_2O$ | 2.0 | 2.0 | 0.5 | 1.6 | 2.0 | 5.6 | 4.4 | 1.9 |
| $K_2O$ | 0.0 | 0.0 | 0.0 | 0.0 | 2.0 | 0.0 | 0.8 | 1.9 |
| $ZrO_2$ | 2.3 | 2.3 | 4.8 | 3.7 | 10.1 | 10.1 | 9.9 | 9.5 |
| $SnO_2$ | 2.1 | 2.1 | 0.0 | 0.0 | 0.0 | 0.0 | 0.0 | 0.0 |
| $P_2O_5$ | 1.5 | 3.0 | 0.0 | 2.1 | 5.9 | 6.0 | 5.8 | 5.6 |
| $B_2O_3$ | 0.0 | 0.0 | 0.0 | 0.2 | 0.0 | 0.0 | 0.0 | 0.0 |
| $Y_2O_3$ | 0.0 | 0.0 | 0.0 | 0.0 | 0.0 | 0.0 | 0.0 | 3.9 |
| SrO | 0.0 | 1.0 | 0.0 | 0.0 | 0.0 | 0.0 | 0.0 | 0.0 |
| MgO | 0.0 | 0.0 | 5.7 | 0.0 | 0.0 | 0.0 | 0.0 | 0.0 |
| Tg | 739 | 714 |  |  | 453 | 440 | 460 | 471 |

Ex. 1 to Ex. 14 and Ex. 16 to Ex. 19

The obtained glass block was processed into a sheet of approximately 60 mm×60 mm×1.5 mm and heat-treated under the conditions shown in Table 2 or 3 to obtain a crystallized glass (Ex. 1 to Ex. 14, and Ex. 16 to Ex. 19). In the column of crystallization treatment of Tables, when two-step treatment conditions are described, this means that the glass sheet was held at the temperature and for the time shown in the upper stage and then held at the temperature and for the time shown in the lower stage. For example, when 750° C. 4 h is written in the upper stage and 920° C. 4 h is written in the lower stage, this means that the glass sheet was held at 750° C. for 4 hours and then held at 920° C. for 4 hours. In addition, when three-step treatment conditions are described, this means that the glass sheet was held at the temperature and for the time shown in the upper stage, then held at the temperature and for the time shown in the middle stage, and furthermore held at the temperature and for the time shown in the lower stage.

The obtained crystallized glass was evaluated for the density, Young's modulus, thermal expansion coefficient, precipitated crystal, Vickers hardness, fracture toughness value, light transmittance, and bend formability as follows. In addition, chemical strengthening treatment was performed and the strengthening properties were evaluated. The results are shown in Table 2 or 3. The blank in the Table indicates unmeasured.

(Density)

The density [unit: g/cm³] was measured by the Archimedes method after processing by mirror polishing into a thickness of 0.8 mm.

(Young's Modulus)

The Young's modulus [unit: GPa] was measured by an ultrasonic method after processing by mirror polishing into a thickness of 0.8 mm.

calculated using a Rietveld method. In the Tables, βSP stands for a β-spodumene crystal, P stands for a petalite crystal, LD stands for lithium disilicate, LS stands for lithium metasilicate, and βQ stands for β-quartz.

Measurement apparatus: SmartLab manufactured by Rigaku Corporation

X-Ray: CuKα radiation

Measurement Range: 2θ=from 10° to 80°

Speed: 10°/min

Step: 0.02°

(Light Transmittance)

After processing by mirror polishing into a thickness of 0.8 mm, an average transmittance (transmittance before forming, transmittance after forming) [unit: %] for light at a wavelength of 380 to 780 nm was measured before the later-described bend formability test and after the test with a configuration using, as a detector, an integrating sphere unit for a spectrophotometer (LAMBDA950 manufactured by PerkinElmer, Inc.), and the difference therebetween was also calculated.

(Vickers Hardness)

The Vickers hardness was measured by pressing an indenter under a load of 100 gf for 15 seconds by use of a Shimadzu micro-Vickers hardness tester (HMV-2 manufactured by Shimadzu Corporation). Incidentally, the Vickers hardness was measured in the same manner also after the later-described chemical strengthening treatment (Vickers hardness before strengthening, Vickers hardness after strengthening).

(Fracture Toughness Value)

Based on JIS R1607:2010, a fracture toughness value after a chemical strengthening treatment (fracture toughness value after strengthening) was determined by an indentation fracture method (IF method) using a Vickers hardness tester (FLC-50V manufactured by Future-Tech Corp.). Indentation was performed under a load of 3 kgf in an atmosphere at a temperature of 22° C. and a relative humidity of 40%. The indentation length was measured in the same atmosphere 20 minutes after the indentation. Measurement was performed at 10 points for each sample, and an average value was calculated and taken as the fracture toughness value [unit: MPa·m$^{1/2}$].

(Bend Formability)

A high alumina insulating firebrick (BAL-99 manufactured by Isolite Insulating Products Co., Ltd.) was processed to prepare two supporting bricks 1 and one loading brick 3, each having a rod shape of 20 mm×20 mm×120 mm. Supporting bricks 1 were placed in parallel at an interval of 40 mm in an electric furnace, and the loading brick 3 was also placed in the same electric furnace, followed by preheating.

Figure 6:
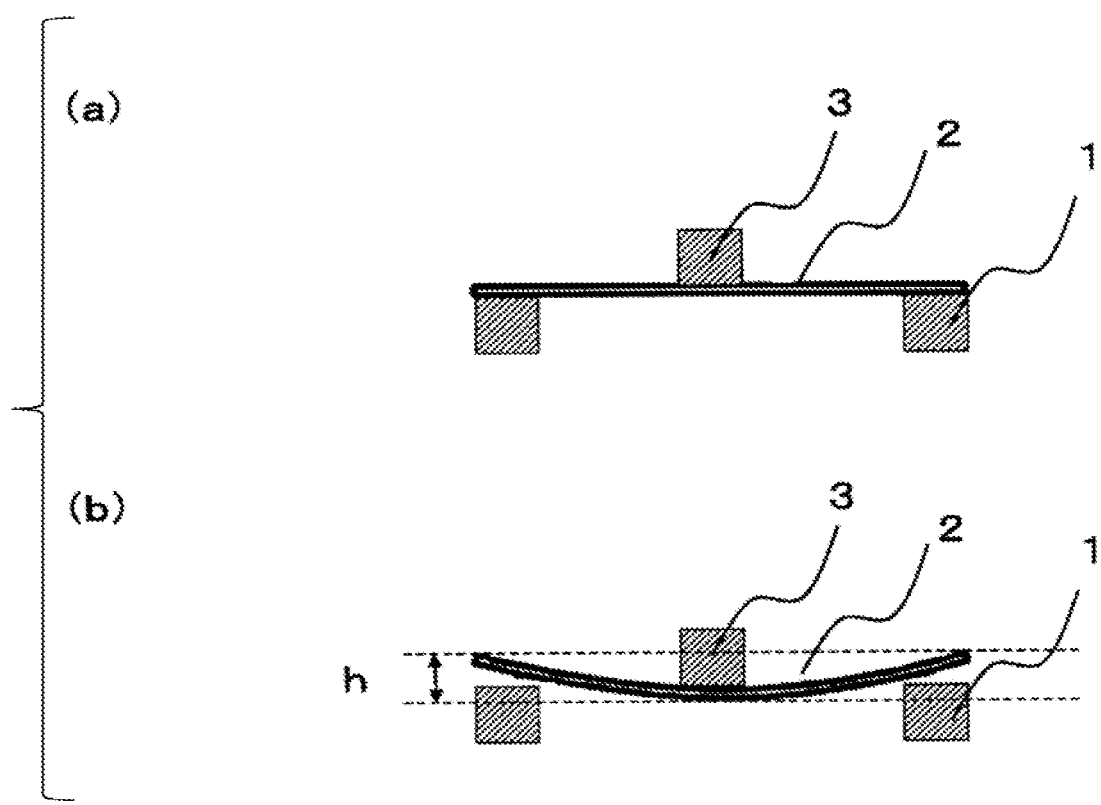
FIG. 6 is a schematic diagram illustrating a test method of bend formability for the crystallized glass; (a) of FIG. 6 illustrates the state before bending; and (b) of FIG. 6 illustrates the state of being heated and thus bent.

The obtained crystallized glass was processed into 60 mm×10 mm×0.8 mm, and both surfaces of 60 mm×10 mm were mirror-polished. In an electric furnace kept at a bending temperature shown in Table 2 or 3, as illustrated in (a) of FIG. 6, the crystallized glass sheet 2 was put on two supporting bricks 1, the loading brick 3 (weight: 85 g) was put on the crystallized glass sheet 2, and these were held for 10 minutes. After the elapse of 10 minutes, the loading brick 3 was removed from the surface of the crystallized glass sheet 2, and the crystallized glass sheet 2 was taken out from the electric furnace and cooled. Thereafter, the deformation amount h (bend-deformation amount) of the crystallized glass, as illustrated in (b) of FIG. 6, was measured. In Tables, "–" means that the glass was scarcely deformed and the deformation amount could not be measured.

(Bend Formability 2)

With respect to Ex. 16 to Ex. 19, a bend-forming test described below was separately performed.

First, carbon-made concave mold and convex mold which were designed for forming a curved surface having a curvature radius of 6.0 mm, a bending angle of 70.5° and a bending depth of 4.0 mm were prepared. And then the crystallized glass sheet was placed near the center of the glass contact surface of the concave mold.

Subsequently, preheating, deformation and cooling were performed using a forming device. Incidentally, the preheating was performed at a temperature at which the crystallized glass has an equilibrium viscosity of about $10^{18}$ Pa·s. The deformation was performed by moving the convex mold downward at a temperature at which the crystallized glass has an equilibrium viscosity of about $10^{11.5}$ Pa·s, followed by pressing the glass with 2,000 N at a maximum.

By the treatment above, the crystallized glasses of all of Ex. 16 to Ex. 19 were formed into a three-dimensional shape having a curvature radius of 2,000 mm.

The above-described test indicated that the crystallized glasses of Ex. 16 to Ex. 19 can be formed into a desired shape.

<Chemical Strengthening Treatment>

The obtained crystallized glass was subjected to a chemical strengthening treatment under the following conditions.

In Ex. 1 to Ex. 8, the glass was immersed in a molten salt of sodium nitrate at 450° C. for 30 minutes, then immersed in a molten salt of potassium nitrate at 450° C. for 30 minutes, thereby performing chemical strengthening.

In Ex. 9 to Ex. 11, the glass was immersed in a lithium sulfate-potassium sulfate mixed salt (in which the mass ratio between the lithium sulfate and potassium sulfate was 90:10) at 740° C. for 240 minutes, thereby performing chemical strengthening.

In Ex. 12 to Ex. 14, the glass was immersed in sodium nitrate at 430° C. for 2 hours, then immersed in potassium nitrate at 430° C. for 2 hours, thereby performing chemical strengthening.

In Ex. 16 to Ex. 19, the glass was immersed in sodium nitrate at 450° C. for 3 hours, then immersed in potassium nitrate at 450° C. for 1 hour, thereby performing chemical strengthening.

(Chemical Strengthening Properties)

A stress value was measured using a surface stress meter FSM-6000 manufactured by Orihara Manufacturing Co., Ltd. and a measuring device SLP1000 utilizing scattered-light photoelasticity manufactured by Orihara Manufacturing Co., Ltd., and a compressive stress value CS [unit: MPa] on the glass surface, a depth DOL [unit: μm] at which the compressive stress value becomes zero, an internal tensile stress (CT) [unit: MPa], and a maximum depth (50 MPa depth) [unit: μm] at which the compressive stress value is 50 MPa or more, were read out. In addition, $m_1$ represented by the following expression was determined from the depth $DOL_1$ at which the compressive stress value is CS/2.

$$m_1 = (CS - CS/2)/(0 - DOL_1)$$

$m_2$ represented by the following expression was determined from the compressive stress $CS_1$ at the depth DOL/4 and the compressive stress $CS_2$ at the depth DOL/2.

$$m_2 = (CS_1 - CS_2)/(DOL/4 - DOL/2)$$

$m_3$ represented by the following expression was determined from the compressive stress $CS_2$ at the depth DOL/2.

$$m_3 = (CS_2 - 0)/(DOL/2 - DOL)$$

These results are shown in Table 2 or 3. In the Table, the blank indicates unmeasured.

TABLE 2

| Glass | Ex. 1 Glass 1 | Ex. 2 Glass 1 | Ex. 3 Glass 1 | Ex. 4 Glass 1 | Ex. 5 Glass 1 | Ex. 6 Glass 2 | Ex. 7 Glass 2 | Ex. 8 Glass 2 | Ex. 9 Glass 3 | Ex. 10 Glass 3 |
|---|---|---|---|---|---|---|---|---|---|---|
| Crystallization treatment | 750° C. 4 h 920° C. 4 h | 920° C. 4 h 750° C. 4 h | 920° C. 4 h 750° C. 4 h | 900° C. 4 h 750° C. 4 h | 880° C. 4 h 750° C. 4 h | 900° C. 4 h 750° C. 4 h | 750° C. 4 h 900° C. 4 h | 750° C. 4 h 900° C. 4 h | 750° C. 4 h 920° C. 4 h | 750° C. 4 h 920° C. 4 h |
| Density | 2.492 | 2.492 | 2.492 | | | 2.48 | 2.48 | 2.48 | 2,9 | |
| Young's modulus | 88 | 88 | 88 | | | 86 | 86 | 86 | 98 | 98 |
| Thermal expansion coefficient | 12 | 12 | 12 | | | 12 | 12 | 12 | | |
| Main crystal | βSP | βSP | βSP | βSP | βSP | βSP | βSP | βSP | βQ | βQ |
| Degree of crystallinity | 25 | 25 | 25 | | | 73 | 73 | 73 | | |
| Crystal size | 55 | 55 | 55 | | | 120 | 120 | 120 | | |
| Transmittance before forming | 87.3 | 87.3 | 87.3 | 87.3 | 88.2 | 89.4 | 89.4 | 89.4 | 83.0 | 83.0 |
| Bending temperature | 1000° C. | 900° C. | 1100° C. | 1000° C. | 1000° C. | 950° C. | 1000° C. | 1100° C. | 1000° C. | 900° C. |
| Transmittance after forming | 85.7 | 86.5 | 76.8 | 85.0 | 83.1 | 88.6 | 86.8 | 72.3 | 80.0 | 79.6 |
| Difference in transmittance before and after forming | 1.6 | 0.8 | 10.5 | 2.3 | 5.1 | 0.8 | 2.6 | 17.1 | 3 | 3.4 |

TABLE 2-continued

| Glass | Ex. 1 Glass 1 | Ex. 2 Glass 1 | Ex. 3 Glass 1 | Ex. 4 Glass 1 | Ex. 5 Glass 1 | Ex. 6 Glass 2 | Ex. 7 Glass 2 | Ex. 8 Glass 2 | Ex. 9 Glass 3 | Ex. 10 Glass 3 |
|---|---|---|---|---|---|---|---|---|---|---|
| Bend-deformation amount | 1.2 mm | — | more than 10 mm | 1.5 mm | — | 1.1 mm | 10 mm | 15 mm | 1.5 mm | — |
| Vickers hardness before strengthening | 780 | 780 | 780 | | | 730 | 730 | 730 | | |
| Vickers hardness after strengthening | 830 | 830 | 830 | | | 820 | 820 | 820 | 1040 | |
| Fracture toughness value after strengthening | 1.2 | 1.2 | 1.2 | | | 1.2 | 1.2 | 1.2 | 1 | |
| CS | 1135 | 1135 | 1135 | | | 1200 | 1200 | 1200 | 590 | |
| DOL | 110 | 110 | 110 | | | 120 | 120 | 120 | 50 | |
| CT | 65 | 65 | 65 | | | | | | | |
| $m_1$ | −104 | −104 | −104 | | | −104 | −104 | −104 | | |
| $m_2$ | −4.0 | −4.0 | −4.0 | | | −4.0 | −4.0 | −4.0 | | |
| $m_3$ | −3.0 | −3.0 | −3.0 | | | −3.0 | −3.0 | −3.0 | | |
| 50 MPa Depth | 95 | 95 | 95 | | | 95 | 95 | 95 | | |

TABLE 3

| Glass | Ex. 11 Glass 3 | Ex. 12 Glass 4 | Ex. 13 Glass 4 | Ex. 14 Glass 4 | Ex. 16 Glass 5 | Ex. 17 Glass 6 | Ex. 18 Glass 7 | Ex. 19 Glass 8 |
|---|---|---|---|---|---|---|---|---|
| Crystallization treatment | 750° C. 4 h 920° C. 4 h | 540° C. 4 h 600° C. 4 h 710° C. 4 h | 540° C. 4 h 600° C. 4 h 710° C. 4 h | 540° C. 4 h 600° C. 4 h 710° C. 4 h | 550° C. 2 h 700° C. 2 h | 550° C. 2 h 710° C. 2 h | 550° C. 2 h 710° C. 2 h | 550° C. 2 h 730° C. 2 h |
| Density | | | | | 2.59 | 2.61 | | 2.66 |
| Young's modulus | 98 | 105 | 105 | 105 | 104 | 106 | 131 | 105 |
| Thermal expansion coefficient | | | | | 134 | 131 | | 123 |
| Main crystal | βC | P, LD | P, LD | P, LD | LS | LS | LS | LS |
| Degree of crystallinity | | | | | 23 | | | |
| Crystal size | | | | | 20 | | | |
| Transmittance before forming | 83.0 | 91.0 | 91.0 | 91.0 | 90.1 | 90.6 | | 90.4 |
| Bending temperature | 1100° C. | 800° C. | 750° C. | 900° C. | 710° C. | | | |
| Transmittance after forming | 71.1 | 89.9 | 90.9 | 29.1 | 90.0 | | | |
| Difference in transmittance before and after forming | 11.9 | 2.1 | 0.1 | 61.9 | 0.1 | | | |
| Bend-deformation amount | more than 10 mm | 5 mm | — | more than 10 mm | 5 mm | | | |
| Vickers hardness before strengthening | | | | | 604 | | | |
| Vickers hardness after strengthening | | 730 | | | 801 | | | 823 |
| Fracture toughness value after strengthening | | 0.8 | | | | | | |
| CS | | 500 | | | 630 | 750 | 900 | 760 |
| DOL | | | | | 130 | | 140 | 126 |
| CT | | | | | | | | |
| $m_1$ | | | | | | | | |
| $m_2$ | | | | | | | | |
| $m_3$ | | | | | | | | |
| 50 MPa Depth | | | | | | | | |

Ex. 15

A glass sheet composed of Glass 1 was bent at 1,000° C. in the same manner as in Ex. 1 and then crystallized under the same crystallization conditions as in Ex. 1. As a result, deformation was again caused, and the glass sheet retuned to the same flat sheet shape as the tray used for the crystallization treatment. This result indicates that the method of performing bend-forming after crystallization makes it easy to retain a desired shape.

Ex. 1 to Ex. 3 were crystallized glasses obtained by crystallizing glass sheets composed of Glass 1 under the same crystallization conditions, in which a β-spodumene crystal was the main crystal.

In Ex. 1, sufficiently high CS and DOL were obtained after chemical strengthening.

In Ex. 2, since the bending temperature was not sufficiently high, the bend-deformation amount was reduced.

In Ex. 3, since the bending temperature was too high, the transparency was reduced.

It is therefore understood that in the case of producing the crystallized glass of to the present invention, the bend-forming temperature must be appropriately adjusted.

Ex. 4 and Ex. 5 were the same as Ex. 1 except that the second treatment temperature in the two-step heating treatment (crystallization treatment) is low, and the change in transparency due to bending treatment was increased, compared with Ex. 1. It is thought that since crystallization before bending treatment was insufficient, the change in transmittance at the time of bending treatment was increased.

Ex. 6 to Ex. 8 were crystallized glasses obtained by crystallizing glass sheets composed of Glass 2 under the same crystallization conditions, in which a β-spodumene crystal was the main crystal.

In Ex. 6, not only sufficiently high CS and DOL were obtained after chemical strengthening but also the transmittance before thermal bending was as high as 89% or more. Consequently, when thermal bending was performed by reducing the difference between the maximum temperature of the crystallization treatment and the thermal bending temperature, a high transmittance of 88% or more was finally achieved. In addition, a sufficiently large bend-deformation amount was obtained.

In Ex. 7, the transmittance before thermal bending was similarly as high as 89% or more. Therefore even when a large bend-deformation amount was obtained by increasing the difference between the maximum temperature of the crystallization treatment and the thermal bending temperature, a high transmittance of 86% or more was finally achieved.

In Ex. 8, since the bending temperature was too high, the transmittance was reduced.

Ex. 9 to Ex. 11 were crystallized glasses obtained by crystallizing glass sheets composed of Glass 3 under the same crystallization conditions, in which β-quartz was the main crystal.

When Ex. 9 is compared with Ex. 1 and Ex. 6, the change in transmittance due to the bend-forming treatment was slightly large in Ex. 9.

Ex. 12 to Ex. 14 were crystallized glasses obtained by crystallizing glass sheets composed of Glass 4 under the same crystallization conditions, and were crystallized glasses containing a petalite crystal.

When Ex. 12 is compared with Ex. 13 and Ex. 14, since the bending temperature was not sufficiently high in Ex. 13, the bend-deformation amount was reduced.

In Ex. 14, since the bending temperature was too high, the transparency was reduced.

It is therefore understood that in the case of processing the crystallized glass, the bend-forming temperature must be appropriately adjusted.

In Ex. 12, since the bending temperature was appropriate, a sufficiently large deformation amount was obtained by bend-forming after crystallization and moreover the change in transparency was small.

When Ex. 12 is compared with Ex. 1 and Ex. 6, the amount of change by bend forming was large in Ex. 12 which was a crystallized glass containing a petalite crystal, and bending thereof was easy.

However, since the compressive stress value (CS) was low and Kc after strengthening was small in Ex. 12, Ex. 1 and Ex. 6 which were crystallized glasses containing a β-spodumene crystal were superior in view of strength.

Ex. 16 to Ex. 19 were crystallized glasses obtained by crystallizing glass sheets composed of Glass 5 to Glass 8, respectively, and all were crystallized glasses containing a lithium metasilicate crystal.

A crystallized glass containing a lithium metasilicate crystal is characterized in that not only sufficiently high CS and DOL are obtained after chemical strengthening but also the transmittance before thermal bending is high. It is seen that when forming is performed at an appropriate bending temperature as in Ex. 16, a sufficiently large deformation amount is obtained and at the same time, the change in transparency can be suppressed.

While the present invention has been described in detail and with reference to specific embodiments thereof, it is apparent to one skilled in the art that various changes and modifications can be made therein without departing from the spirit and scope of the present invention. The present application is based on a Japanese patent application filed on Feb. 27, 2018 (Japanese Patent Application No. 2018-33693) and a Japanese patent application filed on Feb. 8, 2019 (Japanese Patent Application No. 2019-21896), the entireties of which are incorporated by reference. In addition, all the references cited herein are incorporated as a whole.

REFERENCE SIGNS LIST

1 Supporting brick
2 Crystallized glass sheet
3 Loading brick

The invention claimed is:

1. A three-dimensionally shaped crystallized glass, comprising:
a petalite crystal and a lithium disilicate crystal,
wherein the three-dimensionally shaped crystallized glass has an average transmittance of a light at a wavelength of 380 nm to 780 nm of 80% or more in terms of a thickness of 0.8 mm, the three-dimensionally shaped crystallized glass has a Young's modulus of 90 GPa or more, and the three-dimensionally shaped crystallized glass is formed by at least a bending-forming process at a bending temperature of from 700° C. to 900° C. so that a decrease of light transmittance by the bending-forming process is 3% or less.

2. The three-dimensionally shaped crystallized glass according to claim 1, wherein the three-dimensionally shaped crystallized glass has a Young's modulus of 100 GPa or more.

3. The three-dimensionally shaped crystallized glass according to claim 1, wherein the three-dimensionally shaped crystallized glass has an average transmittance of 85% or more.

4. The three-dimensionally shaped crystallized glass according to claim 1, wherein the three-dimensionally shaped crystallized glass has a fracture toughness value of 0.8 MPa·m$^{1/2}$ or more.

5. The three-dimensionally shaped crystallized glass according to claim 1, wherein the three-dimensionally shaped crystallized glass has a haze value in terms of a thickness of 0.8 mm of 1% or less.

6. The three-dimensionally shaped crystallized glass according to claim 1, wherein the three-dimensionally shaped crystallized glass has a Vickers hardness of 680 or more.

7. The three-dimensionally shaped crystallized glass according to claim 1, wherein the three-dimensionally shaped crystallized glass has a Vickers hardness of 700 or more.

8. The three-dimensionally shaped crystallized glass according to claim 1, comprising, in mass % on an oxide basis: from 58 to 74% of $SiO_2$; and from 4 to 11.2% of $Li_2O$.

9. The three-dimensionally shaped crystallized glass according to claim 1, comprising, in mass % on an oxide basis, from 5 to 7.6% of $Al_2O_3$.

10. The three-dimensionally shaped crystallized glass according to claim 1, comprising, in mass % on an oxide basis, from 1 to 10% in total of either one or more of $SnO_2$ and $ZrO_2$.

11. The three-dimensionally shaped crystallized glass according to claim 1, comprising, in mass % on an oxide basis, from 1 to 6% of $P_2O_5$.

12. The three-dimensionally shaped crystallized glass according to claim 1, wherein the three-dimensionally shaped crystallized glass is a chemically strengthened glass having a compressive stress layer on a surface thereof.

13. The three-dimensionally shaped crystallized glass according to claim 1, wherein the three-dimensionally shaped crystallized glass has an average thermal expansion coefficient at 50° C. to 350° C. of from $10 \times 10^{-7}$/C to $30 \times 10^{-7}$/° C.

14. The three-dimensionally shaped crystallized glass according to claim 1, wherein the three-dimensionally shaped crystallized glass is a chemically strengthened glass.

15. The three-dimensionally shaped crystallized glass according to claim 14, wherein the three-dimensionally shaped crystallized glass has $m_1$ of −50 MPa/μm or less, $m_2$ of from −5 MPa/μm to −0.3 MPa/μm, and $m_3$ of from −5 MPa/μm to −0.3 MPa/μm, wherein $m_1$ is an inclination of a stress profile from a surface of the crystallized glass to a depth $DOL_1$, represented by the following expression (1):

$$m_1 = (CS - CS/2)/(0 - DOL_1) \qquad (1)$$

where CS is a compressive stress value at the surface of the crystallized glass, DOL is a depth of the compressive stress at which the compressive stress value is zero, and $DOL_1$ is a depth at which the compressive stress value is CS/2, wherein $m_2$ is an inclination of the stress profile from a depth DOL/4 to a depth DOL/2, represented by the following expression (2):

$$m_2 = (CS_1 - CS_2)/(DOL/4 - DOL/2) \qquad (2)$$

where $CS_1$ is the compressive stress value at the depth DOL/4 from the surface of the crystallized glass, and $CS_2$ is the compressive stress value at the depth DOL/2 from the surface of the crystallized glass, and wherein $m_3$ is an inclination of the stress profile from the depth DOL/2 to the depth DOL represented by the following expression (3):

$$m_3 = (CS_2 - 0)/(DOL2 - DOL) \qquad (3).$$

16. The three-dimensionally shaped crystallized glass according to claim 15, wherein the three-dimensionally shaped crystallized glass has a ratio $m_2/m_3$ of the inclination $m_2$ to the inclination $m_3$ of from 0.3 to 2.

17. A production method for making the three-dimensionally shaped crystallized glass according of claim 1, the method comprising:

heating a glass at a first treatment temperature of 540° C., at a second treatment temperature of 600° C., and at a third treatment temperature of 710° C. in this order for crystallizing the glass, wherein the glass comprises, in mass % on an oxide basis:
from 45 to 74% of $SiO_2$;
from 5 to 8% of $Al_2O_3$;
from 4 to 11.2% of $Li_2O$;
from 1 to 10% in total of either one or more of $SnO_2$ and $ZrO_2$; and
from 1 to 7% of $P_2O_5$.

18. The production method of a crystallized glass according to claim 17, wherein a treatment time for each of the first treatment temperature, the second treatment temperature, and the third treatment temperature is 4 hours.

19. The three dimensionally shaped crystallized glass according to claim 1, comprising, in mass % on an oxide basis, from 58 to 73.6% of $SiO_2$.

20. The three-dimensionally shaped crystallized glass according to claim 19, comprising, in mass % on an oxide basis, from 5 to 7.6% of $Al_2O_3$.

21. The three-dimensionally shaped crystallized glass according to claim 1, comprising, in mass % on an oxide basis, from 0.5 to 5% of $Na_2O$.

22. The three-dimensionally shaped crystallized glass according to claim 1, wherein the three-dimensionally shaped crystallized glass is formed by at least a crystallization process comprising a first heating treatment at a first temperature of 550 to 800° C., and a second heating treatment at a second temperature of 850 to 1,000° C.

* * * * *